United States Patent [19]

Job

[11] 3,831,149

[45] Aug. 20, 1974

[54] DATA MONITORING APPARATUS INCLUDING A PLURALITY OF PRESETTABLE CONTROL ELEMENTS FOR MONITORING PRESELECTED SIGNAL COMBINATIONS AND OTHER CONDITIONS

[75] Inventor: Andre Job, Beaufays, Belgium

[73] Assignee: Burroughs Corporation, Detroit, Mich.

[22] Filed: Feb. 14, 1973

[21] Appl. No.: 332,531

[52] U.S. Cl. ....... 340/172.5, 235/153 AC, 324/73 R
[51] Int. Cl. ........................ G01r 15/00, G06f 11/06
[58] Field of Search ........... 340/172.5; 235/153 AC; 324/73, 72.5, 73 R

[56] References Cited

UNITED STATES PATENTS

| | | | |
|---|---|---|---|
| 3,248,703 | 4/1966 | Moore et al. | 340/172.5 |
| 3,303,471 | 2/1967 | Duncan et al. | 340/172.5 |
| 3,519,808 | 7/1970 | Lawder | 235/153 AC |
| 3,535,683 | 10/1970 | Woods et al. | 340/172.5 |
| 3,540,003 | 11/1970 | Murphy | 340/172.5 |
| 3,585,599 | 6/1971 | Hitt et al. | 340/172.5 |
| 3,599,091 | 8/1971 | Warner, Jr. | 324/73 |
| 3,627,995 | 12/1971 | Warner, Jr. et al. | 340/172.5 X |
| 3,681,758 | 8/1972 | Oster et al. | 340/172.5 |

OTHER PUBLICATIONS

D. W. Anderson et al., "General Purpose Hardware Monitor" in IBM Technical Disclosure Bulletin; Vol. 10, No, 8. Jan. 1968; pp. 1184–1186.

*Primary Examiner*—Paul J. Henon
*Assistant Examiner*—Melvin B. Chapnick
*Attorney, Agent, or Firm*—Benjamin J. Barish; Edward G. Fiorito; William B. Penn

[57] ABSTRACT

Data monitoring apparatus particularly useful for testing a data processing system functioning under its normal program control, comprises a plurality of test leads connectable to selected test points of the data processing system to be tested; a memory for storing information received by the test leads; an output device, such as a visual display or graphic recorder; and read-in, read-out control means including a presettable control device having a plurality of presettable elements, e.g. electrical switches.

The control device includes a group of presettable control elements, one for each test lead, each presettable to a "true" state, a "false" state, or an "indifferent" state, for specifying specific signal-combinations to be monitored, which signal-combinations control the read-in of information into the memory unit, and/or the read-out of information from the memory unit to the output device. Other presettable control elements are included to specify other conditions, such as "AT," "FROM," and "DIFFERENT DATA" conditions, also controlling the read-in and/or the read-out.

40 Claims, 19 Drawing Figures

DATA MONITORING APPARATUS INCLUDING A PLURALITY OF PRESETTABLE CONTROL ELEMENTS FOR MONITORING PRESELECTED SIGNAL COMBINATIONS AND OTHER CONDITIONS

BACKGROUND OF THE INVENTION

The present invention relates to data monitoring apparatus. It is particularly applicable for use in testing data processing systems, including components thereof such as logic blocks, and is therefore described below wih respect to this application.

A number of test apparatus and procedures are now used for testing data processing systems and their components.

In one test procedure, the system or component being tested is operated according to a special test program, producing a series of test results which are recorded and subsequently evaluated. This type of procedure is particularly useful in the final checking out of the system. However, since the tests are performed in a continuous pre-programmed series of steps, this procedure is not always satisfactory in locating specific problems or sources of error. Moreover, the test programs are usually peculiar to each system and therefore must be formulated at the time of and in conjunction with the original design of the system.

In another test procedure, the tests are made at selected points while the clock frequency of the system being tested is reduced, sometimes to the point where the tests are made on a single clock pulse. Such a procedure is also not always satisfactory since the tests are made while the system tested is operated under a special control and clock rate which is different from its normal program control and clock rate. Thus, some problems and sources of error, such as troublesome noises and delays, which may be present during the working operation of the system, may not be detected at all during this special testing operation.

GENERAL OBJECTS OF THE PRESENT INVENTION

An object of the present invention is to provide data monitoring apparatus, and particularly test data apparatus, having advantages in the above respects.

More particularly, an object of the present invention is to provide data monitoring or test apparatus for monitoring or testing a data processing system or component functioning under its own normal program control rather than under a special working operation. Thus, problems and malfunctions which may not arise under a special working operation, may be more easily and accurately located.

A further object of the invention is to provide test apparatus capable of simultaneously testing a plurality of test points of a data processing system or component without disturbing the latter's normal performance.

Another object of the invention is to provide test apparatus enabling the observation and analysis of simultaneously-occuring outputs from a plurality of selected test points.

A further object of the invention is to provide test apparatus which enables the operator to test a system or component over a wide range of conditions, to efficiently record the results of the test, and then to read-out the results for observation or analysis, according to the convenience of the operator.

A still further object of the invention is to provide data monitoring or test apparatus with a read-in and read-out control that enables a limited memory capacity to be efficiently utilized.

BRIEF SUMMARY OF THE INVENTION

The present invention provides data monitoring apparatus for monitoring a data processing system or component functioning under its normal program control. The monitoring apparatus comprises a plurality of input leads connectable to selected points in the data processing system being tested, a buffer register for and fed by each of the input leads, a memory unit, an output device, and control means controlling the read-in of the information from the buffer registers into the memory unit and the read-out of the information from the memory unit into the output device. The control means includes a presettable control device having a plurality of presettable elements, one for each of the buffer registers, controlling the read-in of the information from the buffer registers into the memory unit.

Each of the control elements is presettable to a "true" state, a "false" state, or an "indifferent" state, for specifying various signal-combinations from the input leads, for controlling the read-in of the information from the buffer registers into the memory unit. In the example illustrated below, these presettable control elements are in the form of three-position mechanical switches.

Further, the presettable control device enables a number of other preselected conditions to be set up for the reading of information into the memory unit.

One condition (called "AT" condition) effects a read-in "at" each time there is identity between the setting of the pre-settable elements and the information in the respective buffer registers.

Another condition (called "FROM" condition) effects a continuous read-in starting "from" the time there is identity between the setting of the presettable elements and the information in the respective buffer registers.

The control means includes a further condition-determining means, called "DIFFERENT DATA" condition, for effecting a read-in each time the data sent to the buffer register differs from that fed thereto in the immediately preceding cycle of operation.

The control means includes a further presettable element presettable to one of three states, namely: a true state to specify that the condition specified by the first mentioned presettable elements must be met to enable the read-in or read-out; a false state to specify that the condition must not be met to enable the read-in or read-out, or an indifferent state to enable the read-in or read-out irrespective of whether or not the condition is met.

According to a further feature, the control means include a mode selector switch for selectively operating the apparatus according to a "WRITE" mode wherein information is read into the memory, or according to a "READ" mode wherein information is read out of the memory to the output device. Any one of the above conditions may be selected during either mode of operation, which enables presetting of the apparatus to read into the memory, or read out from the memory, only when the preselected condition has been met, or has not been met, or in either case, as the case may be.

The apparatus therefore not only permits a system or component to be monitored or tested under its normal working operation and clock rate, but also permits the pre-selection of the conditions under which the data received from the system being tested will be recorded in the memory unit, and/or read-out of the memory unit for observation or analysis. Thus, the apparatus provides a powerful tool for monitoring or testing another data processing system or component, and also makes very efficient use of a limited memory capacity.

BRIEF DESCRIPTION OF THE DRAWINGS

The invention is herein described, by way of example only, with reference to the accompanying drawings, wherein.

DESCRIPTION OF A PREFERRED EMBODIMENT

General Layout

Figure 1:
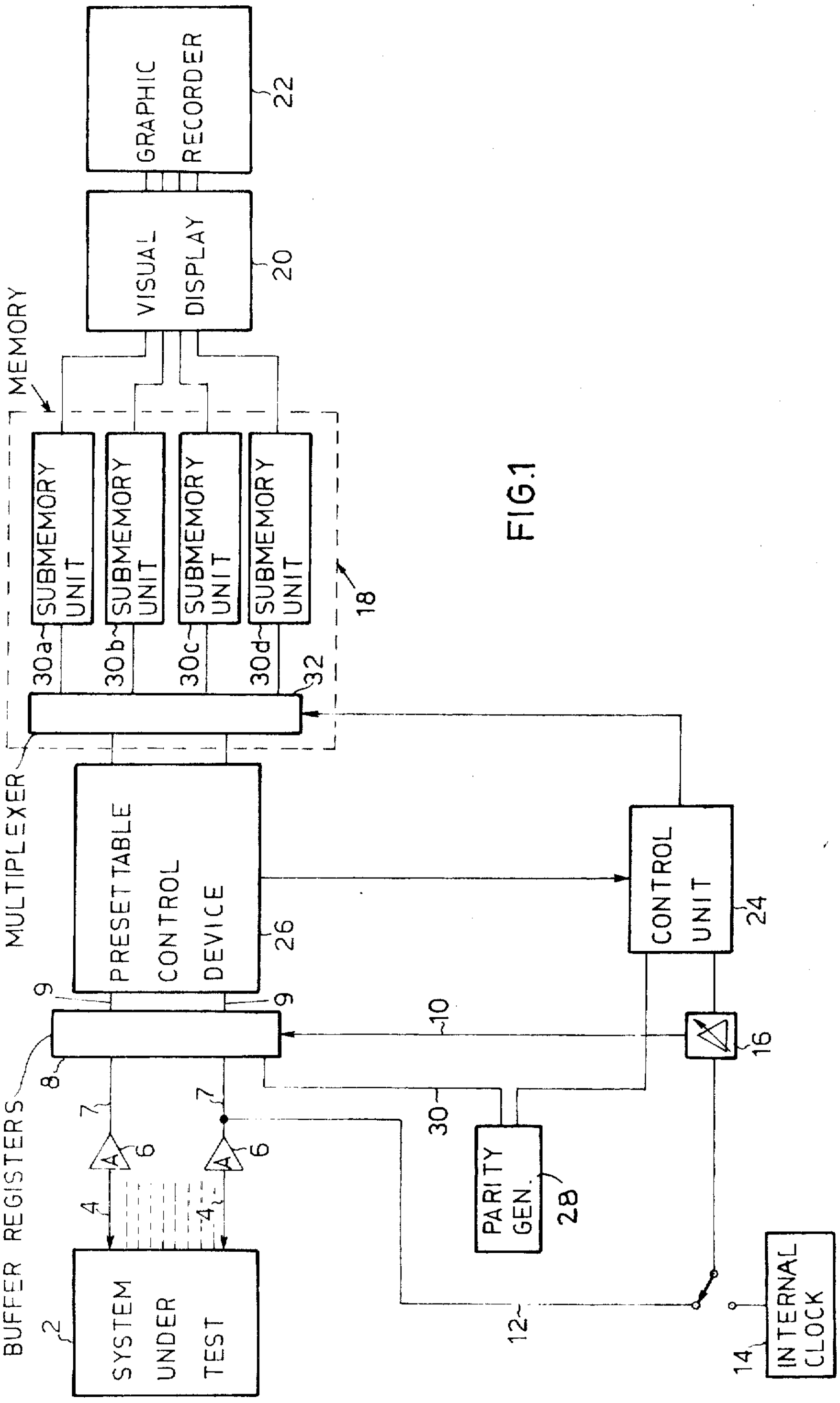
FIG. 1 is a functional block diagram of one form of testing apparatus constructed in accordance with the invention.

FIG. 1 illustrates one form of test apparatus constructed in accordance with the invention.

The system 2 under test, which for example may be a logic unit of a data processing system, is connected to the test apparatus by a plurality of input leads 4. In this case there are 16 input leads 4 connected to preselected test points of the unit 2 under test. Each lead 4 is connected to an amplifier 6 which amplifiers provide output signals of appropriate level and shape on lines 7.

The tests are made on unit 2 while the latter is functioning under its normal program control and clock rate. Therefore input leads 4 should be of high impedence and amplifiers 6 should be of wide bandpass in order to isolate unit 2 from the test apparatus and to avoid disturbing the normal working operation of unit 2 during the time the tests are performed.

The test apparatus further includes a plurality (16) buffer registers 8, one fed by each of the lines 7. Information is stored in registers 8 in synchronism with a clock signal applied to the buffer registers via line 10. This clock signal may be derived from a signal produced in the tested unit 2, via one of the input leads 4, as shown for example by line 12 in FIG. 1. Alternatively, this clock signal may be derived from an internal clock 14, delivered by the test apparatus, the clock frequency of which can be determined by the operator. In both cases, the clock signal is preferably passed through a variable delay 16 before it is fed to buffer registers 8. Delay 16 may be adjustable from zero to one microsecond, for example, to permit the operator to fix the instant of storing the information in the buffer registers with respect to the time it appears on the input leads 4.

The 16-bit buffer registers 8 will thus continuously receive the test signals appearing on the 16 input leads 4 resulting from the tests performed on the tested unit 2. These test signals will be in the binary form, i.e. either a "1" or a "0," amplifiers 6 being set to detect the threshold between the two signal levels and to provide an amplified output signal to the registers 8 of the appropriate level and shape.

The test apparatus further includes a main memory unit, generally designated 18, and control means controlling the read-in of the information from the buffer registers 8 via lines 9 into the memory unit, and also the read-out of the information from the memory unit to an output device. Two output devices are shown in FIG. 1, one being a visual display 20, and the other being a graphic recorder 22.

The control means comprises a central control unit, schematically shown at 24 in FIG. 1, and a presettable control device 26 for pre-fixing the conditions under which the information in the registers 8 will be stored in the memory unit 18, and also the conditions under which the information will be read-out of the memory unit to the output devices 20, 22. The presettable control device 26, including its control by unit 24, is described below in more detail.

The main memory unit 18 is a 320-word, 16-bit memory including four submemory units 30*a*, 30*b*, 30*c* and 30*d*, controlled by a multiplexer 32. Preferably each submemory unit is an MOS static shift register having a maximum clock frequency of 2.5 MHz, thus enabling the test equipment to work at frequencies up to 10 MHz.

Once the information from the tested unit 2 is stored in the main memory 18 under control of the presettable control device 26 and control unit 24, as will be described more fully below, the information may be read-out of the memory to output devices 20, 22 at a rate and time selected by the operator. Visual display 20 may be in the form of indicator tubes or a cathode ray tube, and graphic recorder 22 may be in the form of a multiple-track tape receiving the recorded information from the memory 18 and preferably also receiving timing marks relating to the speed of the tape, to show the phase relation existing between the 16 input signals.

Control unit 24 also includes or controls a parity generator 28 which generates a parity bit and feeds same to registers 8 via line 30, to constitute the seventeenth bit of information fed thereto. When the apparatus reads-out the information from the memory 18, a parity check is made, and if a parity error is found, a signal (called PERL below) is generated which interrupts the read-out.

Figure 2:
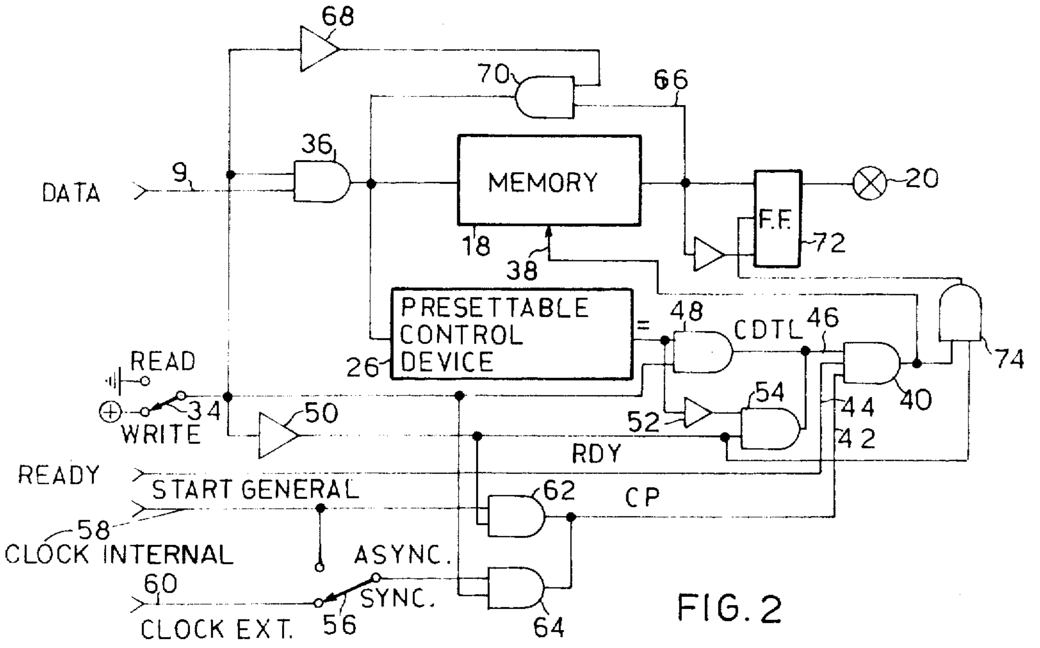
FIG. 2 is a block diagram of portions of the test apparatus of FIG. 1.

FIG. 2 is a schematic diagram of a portion of the test apparatus particularly illustrating the control of the read-in into the memory unit 18 and the read-out therefrom to the output devices, e.g. visual indicator 20.

The test apparatus has two modes of operation each selected by a mode selector switch 34, namely: (1) a WRITE mode, in which the information is read into memory unit 18; and (2) a READ mode, in which the information is read-out of the memory unit to the output device 20.

When selector switch 34 is in the WRITE mode, the test data signals from the buffer register output lines 9 (only one of which is shown in FIG. 2) are fed via AND-gate 36 into the memory unit 18. The actual read-in of this information, however, is controlled by the presettable control device 26, via line 38 and AND-gate 40. AND-gate 40 produces an output signal on line 38 to effect a read-in into memory 18 only if a number of conditions have been met, as determined by the input lines to the gate. Thus, a clock pulse (CP) must appear on input line 42; a "ready" (RDY) signal (to be described below in connection with FIG. 8) must appear on line 44; and the appropriate signal (CDTL, also to be described below) from the presettable control device 26 must appear on line 46.

When the apparatus is in the WRITE mode, a 1 CDTL signal will appear on line 46 only if there is a 1 output from presettable device 26, this being assured by AND-gate 48; and when the apparatus is in the READ mode, a 1 CDTL signal will appear on line 46 only if a 0 appears on the output of device 26, this being assured by inventers 50, 52 and AND-gate 54. As will also be described more fully below, a 1 signal is produced from device 26 generally only when the input data conforms to the prespecified conditions, and a 0 signal is produced when it does not conform. However, device 26 can be preset so that the opposite applies, or that a 1 (or 0) is produced under either case.

The clock pulses CP are fed via line 42 from a selector switch 56 which selects either an internal (within the test apparatus) clock source 58 or an external clock source 60. It will be seen that AND-gates 62, 64 assure that the external clock source 60 can be selected only when the apparatus is in the WRITE mode.

The data read into memory 18 is recirculated through the memory via loop 66, but when the apparatus is in the WRITE mode, inverter 68 and AND-gate 70 prevent the recirculation of the memory information.

The information is read-out of memory 18 via a a flip-flop 72 to the output device 20, but when the apparatus is in the WRITE mode, AND-gate 74 inhibits this read-out.

Signal Names and Functions

A number of signals appearing throughout the apparatus are referred to above and will be described more fully below. It would be helpful at this point to list the names and functions of these signals as well as the other signals referred to below.

These signals, listed in Table 1 below, are binary signals having two logical levels, one of which may be called the logical 1 or high level, and the other of which may be called the logical 0 or low level. The level of the signal which effects its respective function will be understood to be logical 1, i.e. its high level, unless indicated otherwise in the table.

The table also includes five sequence signals (SC00, SC01, SC02, SC03 and SC05) each used for effecting a particular operation of the apparatus. These sequence signals are produced by a sequence counter described below in connection with FIG. 15.

TABLE 1

SIGNALS AND THEIR FUNCTIONS

| | | |
|---|---|---|
| CDTL | condition level | signal delivered by presettable control device 26 when memory read-in is to be effected. |
| RDY | ready | ready signal to enable memory read-in or read-out |
| CLRF | clear flip-flop | signal from clear flip-flop required before memory read-in can be effected |
| MANSTF | manual start | signal from manual start flip-flop |
| RSTTL | remote start level | start signal applied to the input of the remote control unit |
| RSTTF | remote start | signal from remote start flip flop of the remote control unit |
| RSTPL | remote stop level | stop signal applied to the input of the remote control unit |
| RSTPF | remote stop | signal from remote stop flip-flop of the remote control unit |
| SRL | single read | signal to effect a "Single-Read" operation. |
| SKIP | skip | signal to effect a "Skip" operation |
| TIN | buffer information | information in buffer registers 8 |

TABLE 1 – Continued

SIGNALS AND THEIR FUNCTIONS

| | | |
|---|---|---|
| TIN=PRG | buffer information = preset conditions | signal generated when the data input to buffer registers 8 meets preset conditions of control device 26 |
| CTRMAX | maximum counter | signal generated upon reaching maximum capacity of memory normally terminating read-in |
| INHL | inhibit | signal (logical "0") generated by remote control unit when overriding termination of read-in by CTRMAX signal. |
| PERL | Parity error level | signal generated in case of parity error |
| WRITEL | write level | signal delivered by the mode switch 34 while in WRITE position. |
| READL | read level | signal delivered by the mode switch 34 when in READ position. |
| SCAN | scan | scanning pulses in the multiplexer for sequentially distributing the data to the memory sub-units. |
| SC00 | sequence 00 | sequence for resetting the apparatus including memory to "0". |
| SC01 | sequence 01 | sequence for selecting the operational mode for the apparatus. |
| SC02 | sequence 02 | sequence for effecting realignment of data in memory when in READ mode by circulating data until it arrives at initial address of recording. |
| SC03 | sequence 03 | sequence for effecting a "Single-Read" or "Skip" operation in the READ mode. |
| SC05 | sequence 05 | sequence for effecting read-in into memory when apparatus is in WRITE mode. |
| CPMN | clock pulses memory | clock pulses for effecting transfer of data from memory buffer registers to shift registers. |
| CP | clock pulses | clock pulses supplied to various parts of the apparatus (according to the suffix). |

Presettable Control Device 26

The function of the presettable control device 26 is to specify or prefix the conditions under which read-in will be effected into the main memory 18, or read-out from the memory. In this way, the operator can extract from all the test data appearing on the input leads 2, and in the buffer registers 8, only that data which he has determined is relevant to the specific tests he is performing. This not only simplifies his analysis of the data produced, but also makes the best utilization of the limited capacity of the main memory 18.

Figure 4:
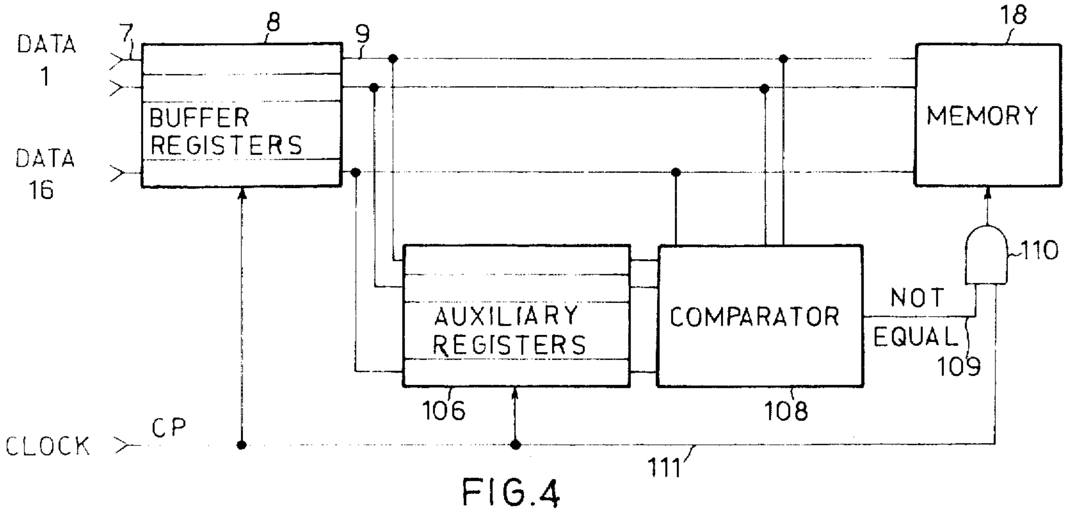
FIG. 4 is a block diagram illustrating generally the DIFFERENT DATA condition-determining means used in the apparatus.
Figure 3:
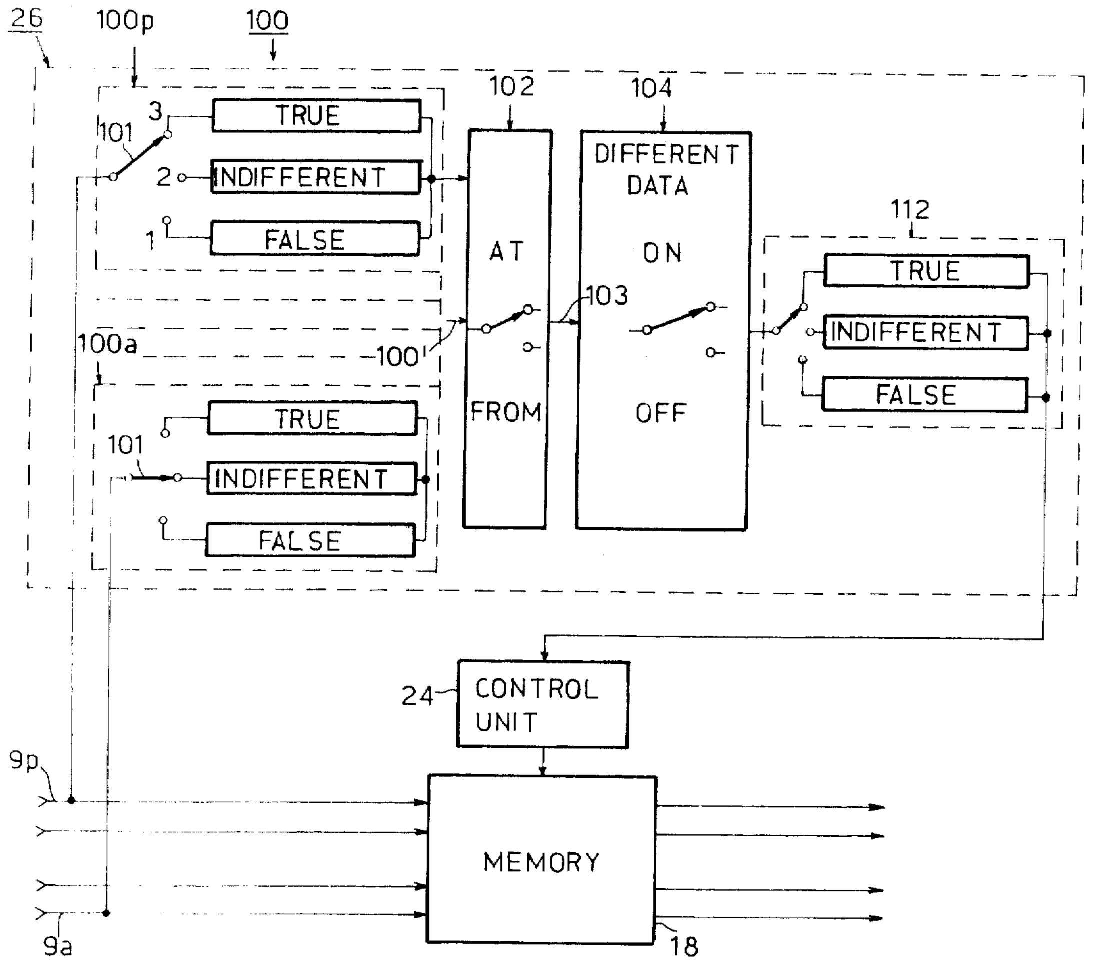
FIG. 3 is a block diagram particularly illustrating the presettable control device for controlling read-in into the memory and read-out therefrom according to certain preselected conditions as specified by the presettable control device.
Figure 5:
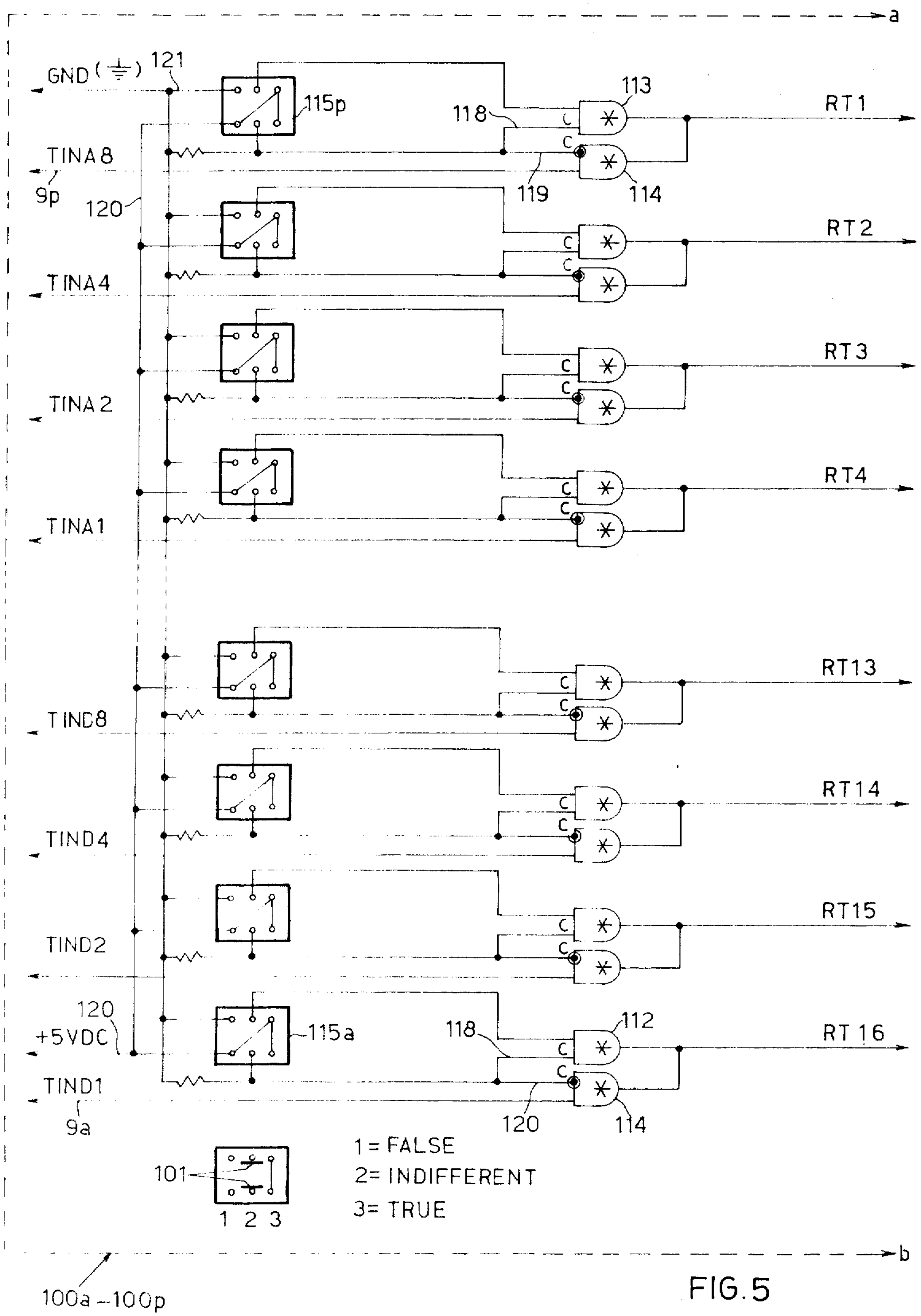
FIGS. 5 and 6 are schematic diagrams illustrating different portions of a specific arrangement which may be used for determining the conditions of reading-in or reading-out.
Figure 6:
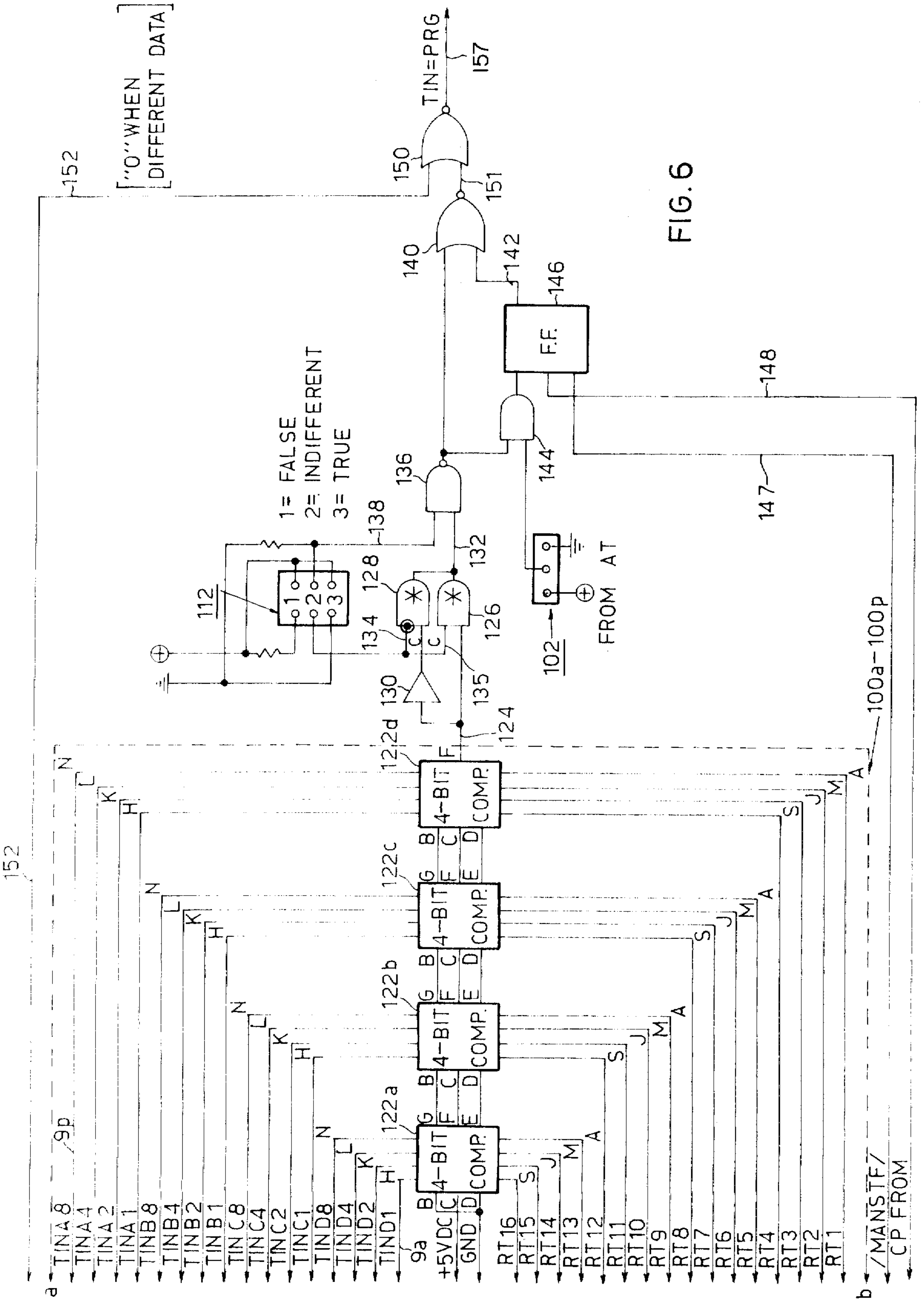

FIG. 3 is a block diagram functionally illustrating the operation of the presettable control device 26 including the pertinent portions of its control unit 24; while FIGS. 4 – 6 are schematic diagrams illustrating a specific arrangement and its operation.

With reference first to the functional block of FIG. 3, the presettable control device 26 comprises a group of sixteen presettable switching systems 100, (each including a presettable mechanical switch 115*a* to 115*p*, FIG. 5) there being one such switching system (100*a* – 100*p*) for each of the leads 9*a* – 9*p* from the buffer registers 8. Each of the switching systems 100 has a movable contact 101 which may be preset to any one of three positions marked, respectively, true, indifferent, and false. The arrangement is such that, functionally speaking, if contact 101 of the respective switching system 100 is in its true position, a logical 1 output is produced on output line 100 whenever a 1 input is applied via its respective input lead 9, and a 0 output is produced whenever a 0 input is applied; if the switching system is in its indifferent position, a 1 output is produced no matter what the input on its respective lead 9; and if the switching system is in its false position, a 0 output is produced whenever its input is 1, and a 1 output is produced whenever its input is 0.

The switching systems 100*a* – 100*p*, including their respective presettable mechanical switches 115*a* – 115*p*, are more particularly illustrated in FIGS. 5 and 6 described below.

The outputs from the sixteen presettable switching systems 100 are influenced by another presettable switch 102 having two positions. One position is labeled AT, and the other position is labeled FROM. When switch 102 is set in its AT position, it will enable a read-in into the memory unit AT any time the data appearing on input leads 9 is identical to the settings of the 16 switching systems 100. When switch 102 is in its FROM position, a read-in will be enabled starting "from" the time there is identity between the input on leads 9 and the settings of switching systems 100. That is to say, when the switch is in its AT position, a single read-in cycle will be generated when identity occurs, and when it is in its FROM position, a plurality of read-in cycles will be generated starting from the time the identity occurs. In the latter case, the read-in will continue until manually terminated or until automatically terminated by the memory reaching its maximum capacity, as will be more fully described below.

The presettable control device 26 includes another switch 104, called a DIFFERENT DATA switch and having an "on" position and an "off" position. When the switch is in its "on" position, it is effective to produce a read-in into memory unit 18 whenever the data on input lines 9 differs from that on the input lines during the preceding clock cycle of the apparatus. That is to say, a read-in of any data will be effected only when that data differs from that appearing on the input lines during the preceding clock cycle. If switch 104 is in its "off" position, the switch is disabled from imposing the condition of reading-in only "different data".

Figure 7:
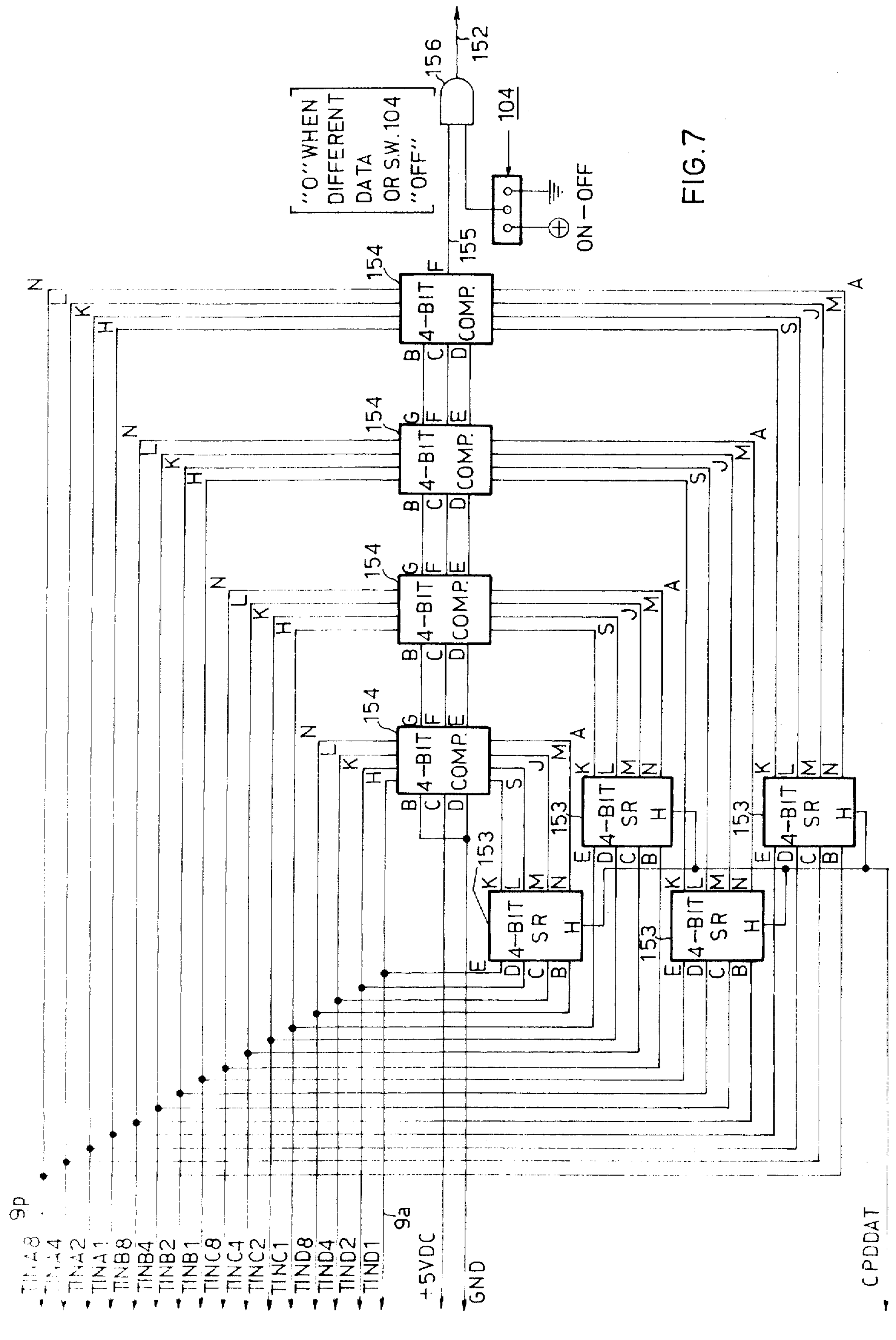
FIG. 7 illustrates a specific DIFFERENT DATA condition-determining arrangement that may be used.

FIG. 4 illustrates a general arrangement for determining when "different data" exists, while FIG. 7 illustrates a specific arrangement that may be used.

With reference to FIG. 4, it will be seen that the data on input leads 7 is fed to registers 8, and the output from these registers is fed via lines 9 to an auxiliary bank of registers 106, there being one auxiliary register 106 for each register 8. The information stored in registers 8 is compared with that stored in the auxiliary registers 106 by means of a comparator 108. When there is identity between the two, a logical 0 output signal is produced on line 109 from comparator 108, and if no identity exists, a logical 1 signal is produced on that line. Thus, when no identity exists, a 1 signal is applied to AND-gate 110 so that during its next clock pulse, applied on line 111, an output will be produced from the AND-gate to effect a read-in of the information from the registers 8 to the main memory unit 18.

The presettable control device 26 includes a further switch 112 (FIG. 3) which is presettable to one of three positions, namely true, indifferent, and false. Setting switch 112 to its true position effects a read-in into (or read-out from) the memory when the information from the input leads 9 meets the condition specified by the settings of the sixteen switching systems 100; whereas setting switch 112 to its false position effects a read-in (or read-out) when the specified condition is not met. Setting switch 112 to its indifferent position effects a read-in or read-out irrespective of whether or not the condition is met.

Whenever information is to be read-into (or out from) the memory, the setting of switch 102 determines whether the information will be read according to the AT condition (i.e. only "at" the time the conditions specified by switching systems 100 are met, or not met, depending on switch 112), or according to the FROM condition (i.e. starting "from" the time of meeting or not meeting the conditions and continuing until terminated); and as described above, the setting of the DIFFERENT DATA switch 104 determines whether the read-in (or read-out) will be effected when the data differs from the previous data ("on" position), or does not ("off" position).

As indicated earlier an arrangement that may be used for the 16 switching systems 100*a* – 100 is shown in FIGS. 5 and 6. FIG. 6 also illustrates the means for presetting for the AT and FROM conditions (block 102, FIG. 3) and for the three conditions of switch 112; and FIG. 7 illustrates a logical arrangement that may be used for presetting for the DIFFERENT DATA condition of block 104 in FIG. 3 and generally illustrated in FIG. 4.

Referring first to FIG. 5, it will be seen that there are sixteen three-position presettable mechanical switches 115*a* – 115*p*, one for each of the input leads 9*a* – 9*p* from the buffer registers 8. Switches 115*a* – 115*p* are each outputted through a pair of tristate AND-gates 113, 114 to their respective output lines RT1–RT16.

Tristate gates are used herein (and in other parts of the system) to provide maximum interfacing capability. These gates, which are well known per se, have three states, namely a 1 state of low impedance, a 0 state of low impedance, and an "off" state of high impedance (10 Megohm). Both gates 113, 114 include an "output enable" line 118, 119, the latter having an inverter, as shown. A +5 voltage is applied to one terminal of each switch via line 120, and the opposite terminal of the switch is connected to ground via line 121. The arrangement is such that when a presettable switch 115*a* – 115*p* is preset: (1) in its position 1 (false), the +5 volts on line 120 enables gate 113 and disables gate 114; (2) in its position 2 (indifferent), the 0 volt on line 121 enables gate 114 and disables gate 113; and (3) in its position 3 (true), the +5 volts on line 120 enables gate 113 and disables gate 114.

As shown in FIG. 6, the signals appearing on the input leads 9*a* – 9*p* (also designated input TIN lines) are also applied to four 4-bit comparators 122*a* – 122*d*, and are compared to the signals appearing on the respective output lines RT1–RT16. If a "match" occurs in all four comparators, a logical 1 output is produced on the output line 124 (corresponding to line 100′ of FIG. 3), and if a "no-match" occurs in any of the comparators, a logical 0 output is produced.

The presettable switching systems 100*a* – 100*p* operate as follows:

a. If the presettable switch 115*a* – 115*p* of the respective switching system is set in its "indifferent" position, its respective gate 114 is enabled, and therefore the signal on its output RT line will be the same as on its input TIN line. Accordingly, there will always be a "match" in the respective comparator 122*a* – 122*d*, so that a logical 1 will always appear on output line 124.

*b*. If the presettable switch is set in its "false" position, its gate 113 is enabled, and the output of that gate will always be 0 because of the 0 voltage applied to its other input via line 121. Accordingly, there will be a "match" in the respective comparators (and a logical 1 on the output line 124) only when the TIN input is 0 (i.e. the false condition).

*c*. If the presettable switch is set in its "true" position, its gate 113 is likewise enabled, but here the output of the gate will always be 1 because of the +5 volts applied thereto via line 120. Accordingly, there will be a "match" in the respective comparator (and a logical 1 on the output line 124) only when the respective TIN input is 1 (i.e. the "true" condition).

The output on line 124 is fed to another pair of tristate AND-gates 126, 128 of the same type as gates 113, 114. In this case the output is applied directly to gate 126 and, through an inverter 130, to gate 128. The output enable lines of the tristate AND-gates 126, 128 are controlled by the setting of three-position switch 112, corresponding to the similarly numbered switch in FIG. 3. Thus, if switch 112 is set to its "true" position, the output enable lines 134, 135 will cause AND-gate 128 to be "off" and AND-gate 126 to be "on," whereupon the signal appearing on line 124 will also appear on line 132. If switch 112 is in its "false" position, gate 128 will be "on" and gate 126 will be "off," whereupon the signal appearing on line 122 will be the inversion of that on line 124. If switch 112 is in its "indifferent" position, the output control lines 134 and 135 are left open, but line 138 is forced to logical 0, causing a 1 to appear at the input of NOR-gate 140, no matter what signal is on line 124.

The signal on line 132 is passed through a NAND-gate 136 which gate is also controlled by the setting of switch 112. Thus, if the switch is either in its "true" or "false" positions, a 1 is applied to the second input 138 of gate 136, whereas if the switch is in its "indifferent" position, a 0 is applied.

The output of NAND-gate 136 is applied to NOR-gate 140, the latter having a second input applied through line 142 controlled by the setting of the FROM-AT switch 102. When the latter is in its FROM position, a 1 signal is applied to AND-gate 144, whereas if switch 102 is in its AT position, a 0 signal is applied to that gate.

The output of gate 144 is applied to the J-input terminal of a flip-flop 146 preferably of the dual JK master-slave type. The K-input terminal of flip-flop 146 is connected to receive the MANSTF signal (manual start) via lead 147, and the trigger input is connected to receive the "From" clock pulses (CPFROM) via line 148.

The output from NOR-gate 140 is fed to NOR-gate 150, the latter having another input via line 152 connected to the DIFFERENT DATA condition system.

The DIFFERENT DATA condition system, generally described above in connection with FIG. 4, is specifically illustrated in FIG. 7. It will be seen that the information in the buffer registers at any one particular instant appears on lines 9*a*–9*p*. During one clock cycle this information is fed to four 4-bit shift registers, 153 (e.g. right-shift, left-shift SN 7495 registers), which act as the auxiliary storage 106 in FIG. 4. At the next clock pulse, the information in auxiliary registers 153 is compared with that in the buffer registers 8 as appearing on line 9*a* - 9*b*, in four 4-bit comparators 154 (e.g. SN 7485). If there is no identity output line 155 is "false," i.e. it carries a 0 signal. The latter signal is fed to AND-gate 156 having a second input from "on-off" switch 104, such that when the switch is "on" and a 0 signal appears on line 155 (indicating no identity, or "different data"), a 0 is produced on output line 152 to designate the presence of "different data," and when switch 104 is OFF, a 0 will always be present on line 152.

Referring back to FIG. 6, it will be seen that whenever a 0 signal from the "different data" input 152 is present or a 0 signal from the "At-From" input 151 is present, NOR-gate 150 will produce a 1 signal on output line 157. This latter signal is called TIN = PRG, which, from Table 1, indicates that the data input to the buffer registers 8 meets the preset conditions of control device 26; this signal enables a read-in into the memory unit, as will be described more fully below.

WRITE Mode

As described above in connection with FIG. 2, switching the apparatus to the WRITE mode enables a read-in into the main memory 18, but before this can be done a number of prior conditions must first be met, as determined by AND-gate 40. One of the conditions is that a RDY (ready) signal be applied to gate 40 via line 44.

Figures 8, 9:
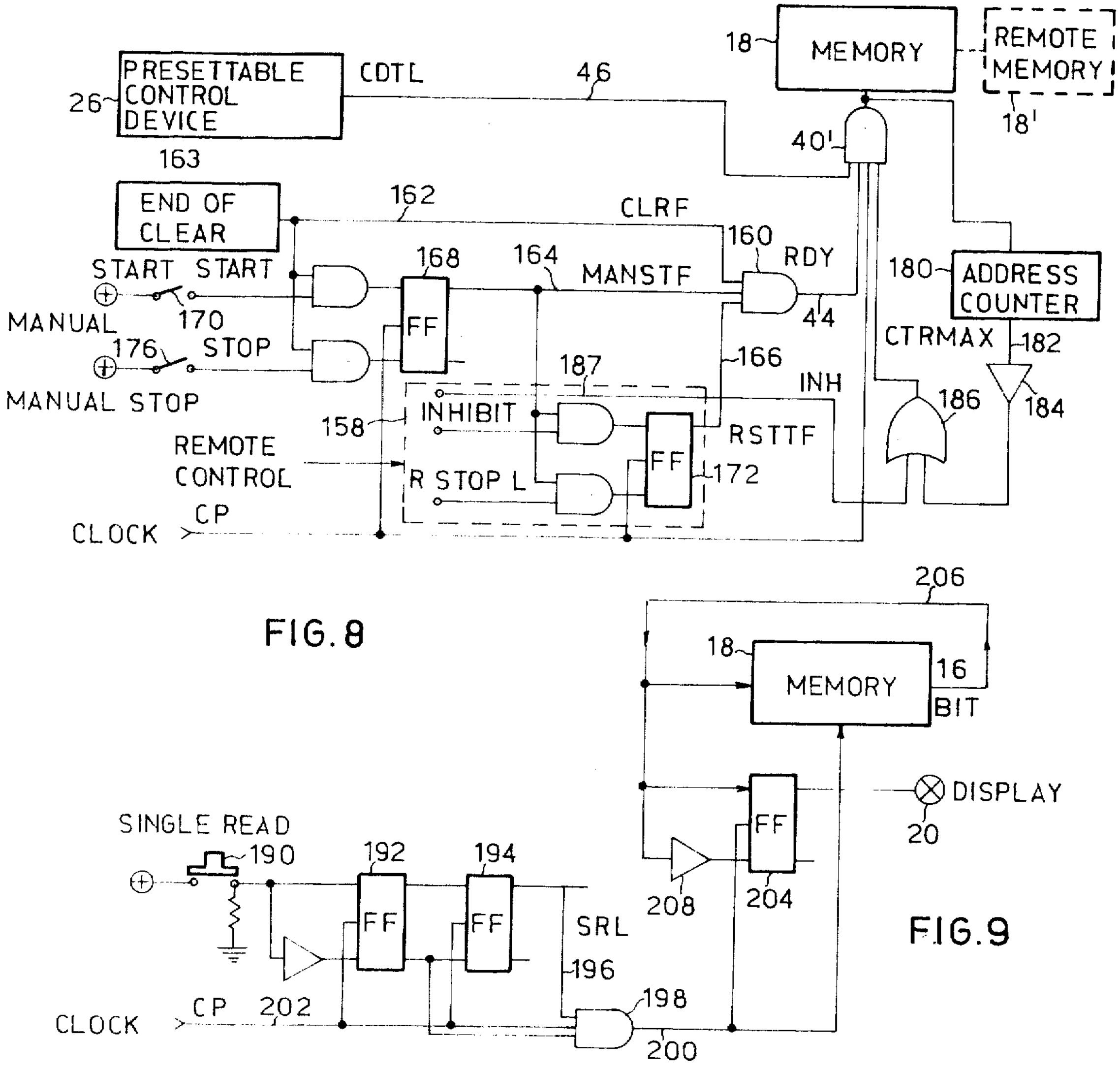
FIG. 8 is a schematic diagram illustrating various read-in operations when the apparatus is in the "WRITE" mode.
FIG. 9 is a schematic diagram illustrating the "SINGLE READ" operation when the apparatus is in the READ mode.

FIG. 8 illustrates how this RDY signal is produced. FIG. 8 also illustrates the AND-gate which controls the read-in into the memory 18, but in FIG. 8 this gate is shown as 40' rather than 40 in FIG. 2 because it is modified so that it requires a still further condition to be met before effecting the read-in into the memory. Further, FIG. 8 illustrates the use of a remote or auxiliary control unit 158 for controlling the starting or stopping of the read-in into the memory. This figure additionally illustrates the use of a remote or auxiliary memory 18' to supplement the main memory 18. Such optional features provide a number of important further advantages which will be described below.

The RDY signal on line 44 is produced by AND-gate 160 when three conditions have been met as determined by its input lines 162, 164 and 166. Thus, line 162 requires the presence of a CLRF signal from the CLEAR unit 163 (e.g. Clear push-button 270, FIG. 13), to assure that the apparatus has been cleared. Secondly, a MANSTF (manual start) signal must appear on line 164, this signal being produced by flip-flop 168 when the Manual Start button 170 has been depressed. Thirdly, a RSTTF (remote start) signal must appear on line 166, this signal being delivered by remote start flip-flop 172 when the remote or auxiliary control unit 158 is in its "start" condition.

It will also be seen from FIG. 8 that whenever the Manual Stop button 176 is depressed, or whenever the remote control unit 158 delivers an RSTPF (remote stop) signal, the RDY signal will cease to appear on line 44, which will terminate the read-in into the memory.

Once read-in into the memory is started it will continue (assuming the other conditions illustrated in FIG. 8 are also met) until the read-in is stopped. This may be done manually by push-button 176, remotely by unit 158, or automatically when the maximum capacity of the main memory 18 has been reached.

To test for the latter condition, each read-in signal from AND-gate 40' also increments an address counter 180, and when the maximum capacity of the memory has been reached, a CTRMAX signal is produced on line 182 indicating this condition. This signal is inverted by inverter 184 and passes through OR-gate 186 to AND-gate 40'. Thus, the latter gate willl enable a read-in into the memory 18 so long as the maximum capacity of counter 180 has not been reached, and as soon as it has been reached, AND-gate 40' will disable any further read-in into the memory.

Remote control unit 158 also includes means for inhibiting or overriding this disablement of the read-in when the maximum capacity of the memory has been reached. For this purpose the remote control unit may apply an INH (inhibit) signal via line 187 to OR-gate 186, which will thereby override the CTRMAX signal applied from counter 180 should the maximum capacity of that counter have been reached.

The inclusion of "remote memory" 18', fed from the main memory 18, further enlarges the practical use of the test apparatus as will also be described below.

READ Mode

As described above with reference to FIG. 2, when the apparatus is in the READ mode, the information stored in the main memory unit 18 may be read-out into the output device (e.g. display 20) for study or analysis. In the READ mode, the apparatus may be operated according to a "Single Read" operation or a "Skip" operation, by depression of the appropriate operation key.

FIG. 9 illustrates the "Single Read" operation. This is initiated by depressing Single Read push button 190 which, by means of flip-flops 192, 194, produces a SRL (Single Read) signal on line 196, which signal is applied to AND-gate 198. With each depression of Single Reach push-button 190, a single pulse is produced on the gate output line 200, this pulse being in synchronism with the clock pulse on line 202. The pulse on line 200 is applied to memory 18 to effect a read-out from that memory via flip-flop 204 to the display device 20. The read-out information is recirculated back into the input of the memory, via line 206, the latter line also resetting flip-flop 204 through inverter 208.

The arrangement is such that with each depression of the Single Read button 190, only one read-out memory cycle is effected to the output device 20. In this operation, the output device 20 would preferably be a visual indicator, enabling the operator to visually observe the contents of the memory 18 by repeatedly depressing button 190. The information read-out of the memory is also recirculated back into the input of the memory via loop 206 so that the contents are not lost.

Figure 10:
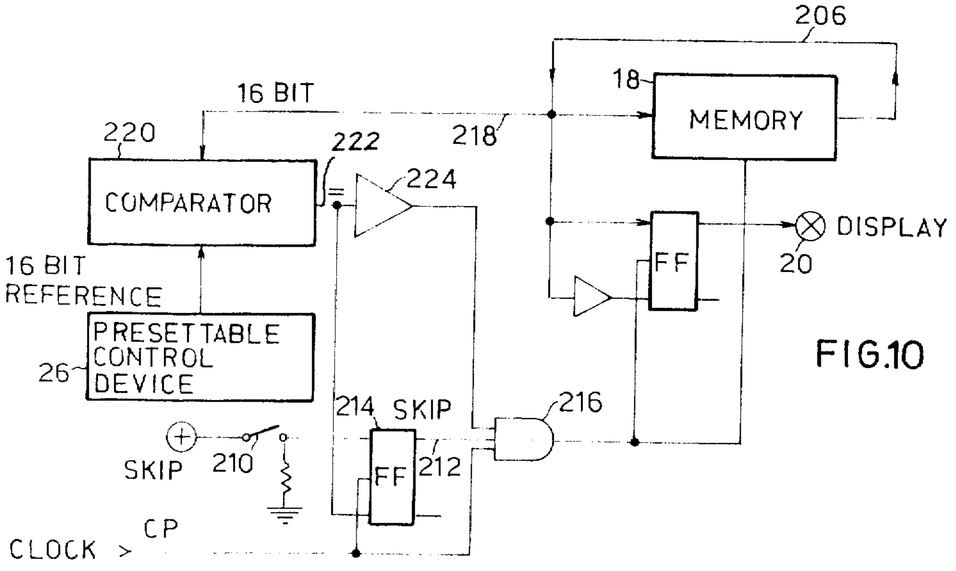
FIG. 10 is a schematic diagram illustrating the "SKIP" operation when the apparatus is in the READ mode.

FIG. 10 illustrates a "Skip" operation which is initiated by the depression of the Skip push-button 210. This operation enables the operator to read-out from the memory only selected information. The presettable control unit 26 is also used for this purpose to specify the conditions of read-out, i.e. the information selected for read-out. Thus the operator can select to read-out only the information he feels most relevant to the particular test performed, thereby facilitating his analysis of the tests and possible sources of error.

In using presettable control device 26 for selecting the information to be read-out of the memory, the operator would preferably set the mechanical switches of this device in accordance with the information which should have been recorded (called "specified information") in the memory. The information actually stored in the memory is then read-out via line 218 into a comparator 220, where it is compared with the specified information from the presettable control device 26, the comparator producing a 1 signal on line 222 when a match occurs. The operator, however, is usually more interested when a mix-match occurs, i.e. when the actually-stored information deviates from the specified information, and therefore this signal is inverted by inverter 224 and applied to AND-gate 216. The latter continues the read-out from the memory to the display device 20 all the while that mis-matches occur between the specified information preset in control device 26, and the actually stored information read-out from memory 18.

Thus, when the "Skip" button 210 is actuated, read-out memory cycles occur whenever the information stored in the memory does not match that specified in the presettable control device 26. This facilitates the read-out of only the information which the operator feels is relevent to the tests.

While FIG. 10 illustrates an inverter (224), actually the function of inverter 224 is performed by the "false" position of switch 112, as described above with references to FIGS. 3 and 6.

Main Memory 18

The main memory 18 may take a number of forms. Preferably, an MOS static shift register is used. However, since the maximum working frequency of MOS shift registers is about 2.5 MHz, and since the maximum working frequency of the apparatus illustrated has been fixed to 10 MHz, an arrangement is used including four multiplexed submemory units.

Figure 11:
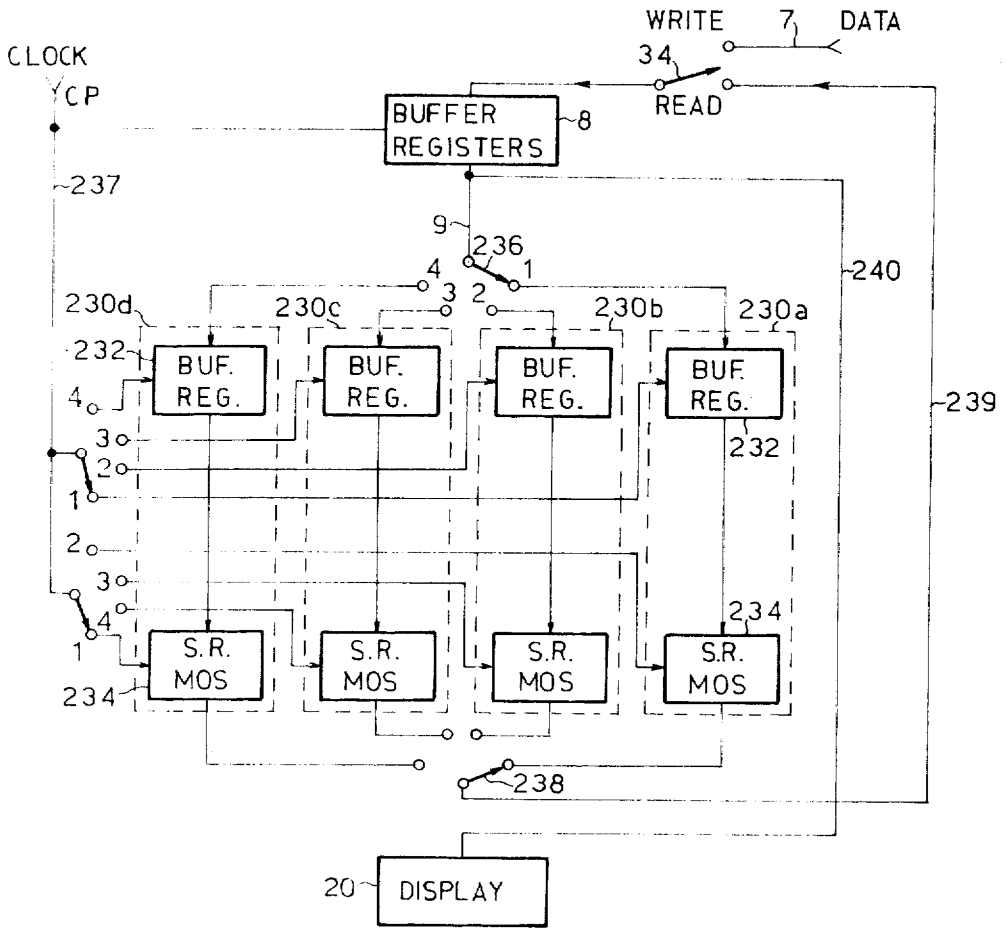
FIG. 11 diagrammatically illustrates generally the control of the memory comprising a plurality (4) of multiplexed submemory units each being an MOS type shift register.

This is shown generally by the block diagram of FIG. 11, wherein it will be seen that the main memory 18 is divided into four submemories **230*a* – 230*d*, each of which includes a buffer register 232 and an MOS shift register 234. When the apparatus is in the WRITE mode, as determined by the position of selector switch 34, the data entering input lines 7 via the buffer registers 8 appears on lines 9 and is sequentially distributed by scanner switch 236 to the four submemory units 230*a* – 230*d*, first to the respective buffer register 232 and then to the respective MOS shift register 234. Clock pulses CP applied via conductor 237 effect the transfer from the buffer registers 232 to the MOS shift registers 234** of the respective submemory unit.

When the apparatus is in the READ mode, the information is re-circulated back to the input of the memory, more particularly to the buffer registers 8, via scanner switch 238 and line 239.

The four buffer register 232 may be of any suitable type capable of operating at the maximum frequency of 10 MHz. The shift registers 234 are preferably MOS static shift registers, as indicated above, capable of operating at a maximum frequency of 2.5 MHz.

Scanner switches 236 and 238 may consist of a ring counter, a Mod-4 counter or any other suitable arrangement for sequentially distributing the information to the buffer registers 232 of units **230*a* – 230*d*.**

In the arrangement illustrated in FIG. 11, the display 20 is permanently connected to the buffer registers 8 via conductor 240.

Figure 12:
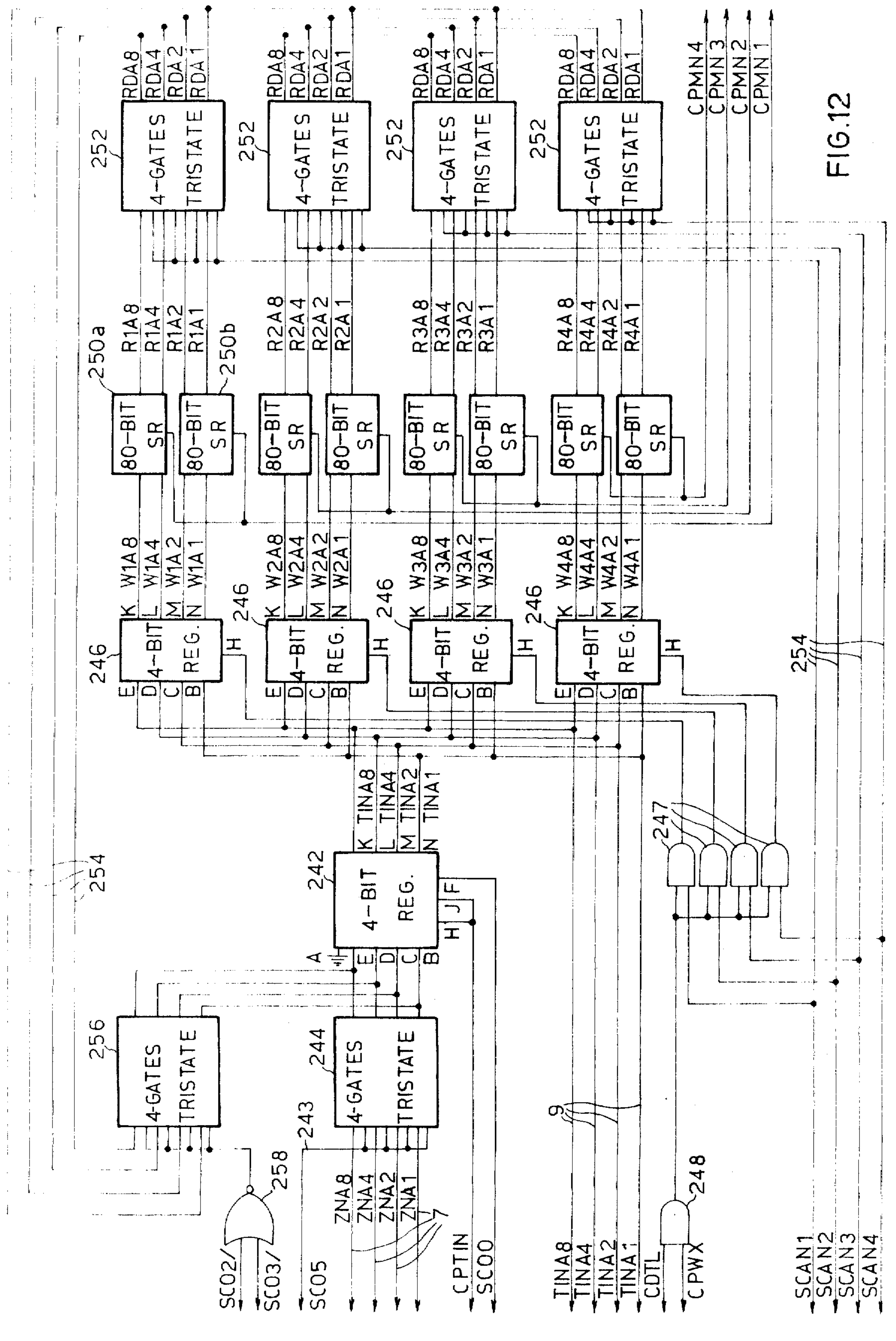
FIG. 12 illustrates a specific multiplexed MOS shift register arrangement that may be used.

FIG. 12 illustrates, for purposes of example, a specific MOS shift register arrangement including its controls, which may be used. For simplification purposes, FIG. 12 illustrates only one data input lead (7), and the associated components, for each of the four submemory units.

The data is fed through the four input conductors 7, one for each of the four submemory units, to four storage registers 242, each being a four-bit right-shift, left-shift register (e.g. SN7495). The feed in is controlled by four tristate AND-gates 244, the output enabling control of which is fed by signal SC05, which as indicated in Table 1, serves to effect a read-in into the memory when the apparatus is operated in the WRITE mode.

Storage registers 242 correspond to the buffer registers 8 in FIGS. 1 and 11.

From registers 242, the information is distributed to the four memory buffer registers 246 by scanning pulses SCAN via AND-gates 247, the enabling input of which is controlled by another AND-gate 248 having one input receiving a clock pulse and the other receiving the CDTL signal. As indicated in Table 1 (also FIG. 8), the CDTL signal is delivered by the presettable control device 26 when memory read-in is to be effected. The generation of the CDTL signal is described below with reference to FIG. 14.

Each of the buffer registers 246 feeds the information to a pair of shift registers **250*a* and 250*b*, each preferably being a dual 80-bit MOS static shift register (e.g. MM5054). The transfer of the information from the buffer registers 246 to the respective shift registers 250*a*, 250*b*** is controlled by clock pulses CPMN1–CPMN4.

The output of the shift registers **250*a*, 250*b* is passed through tristate AND-gates 252 in which the output-enable signals are supplied by the SCAN pulses via conductors 254.** The use of the tristate gates provides maximum interfacing capability, as described above.

The information in the shift registers **250*a*, 250*b* is circulated back to the memory input through AND-gates 252, conductors 254 and another group of four AND-gates 256, also of the tristate type. In the latter case the output-enable signal is supplied from NOR-gate 258 having two input signals, SC02 and SC03. As shown in Table 1, signal SC02 effects realignment of information in the memory when the apparatus is in the READ mode, by circulating the information in the memory until it arrives at the initial address of recording; and signal SC03** enables a SINGLE READ or SKIP operation.

The recirculated information is reintroduced into buffer registers 242 at a clock rate controlled by clock pulse CPTIN. In addition, registers 242 are controlled by signal SC00 which is supplied (see Table 1) whenever the apparatus including the memory is to be reset to zero.

The information in buffer registers 242 is available to the presettable control device 26 (FIG. 1) via conductors 9.

Further Specific Arrangements and Variations

FIGS. 13–16 are schematic diagrams illustrating further specific arrangements and several variations.

Figure 13:
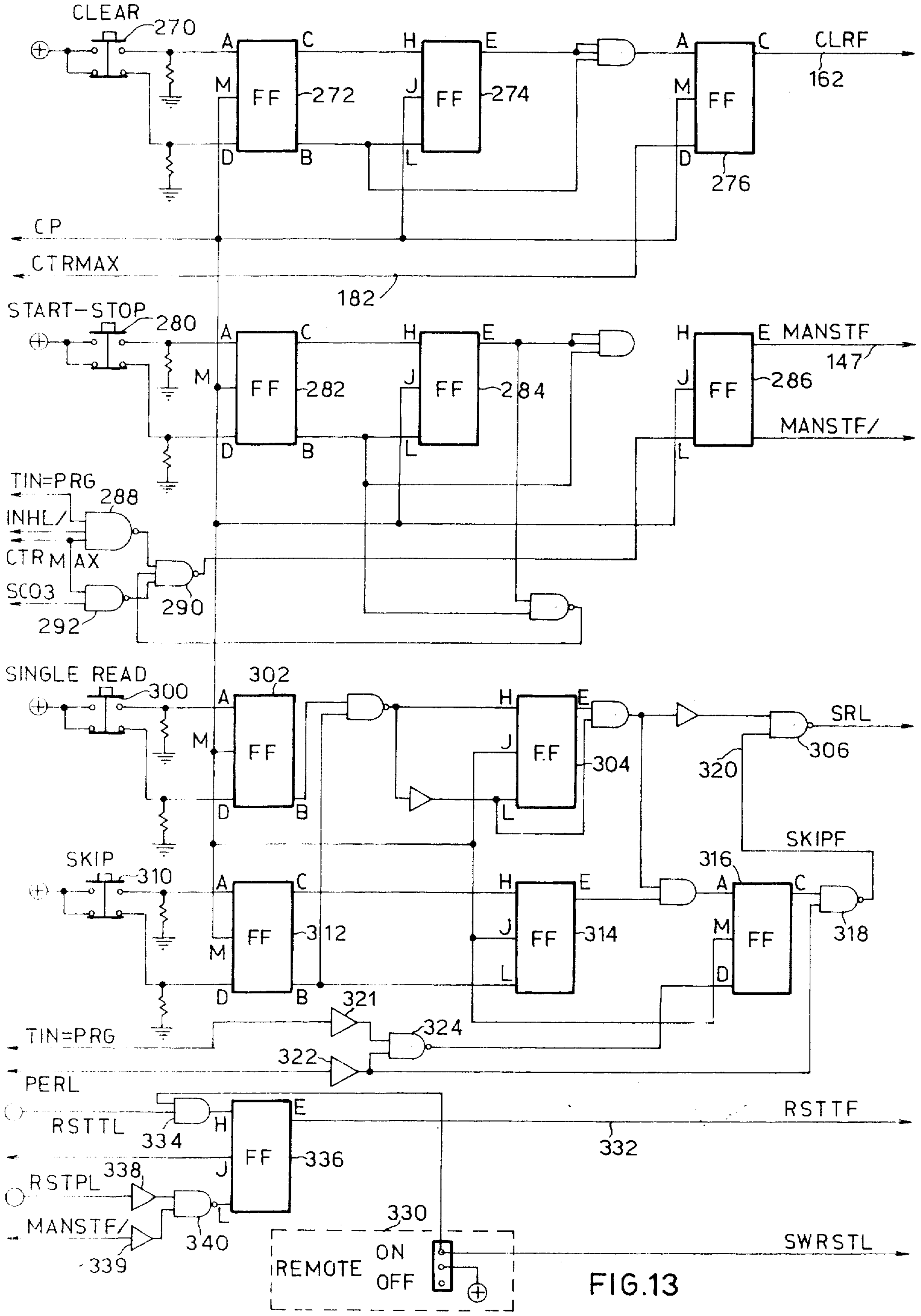
FIG. 13 is a schematic diagram illustrating further specific arrangements and several variations that may be used for the various operation of FIGS. 8–10.

With reference to FIG. 13, when the apparatus is in the WRITE mode, the CLRF (clear) signal on line 162 is produced by Clear button 270 and flip-flops 272, 274 and 276. In the arrangement illustrated in FIG. 13, as distinguished from that illustrated in FIG. 8, the CLRF signal is terminated by the generation of a CTRMAX signal produced when the maximum capacity of the memory has been reached.

In addition, in the arrangement illustrated in FIG. 13 the MANSTF (manual start) signal is produced by the Start-Stop button 280 and flip-flops 282, 284 and 286. By the arrangement illustrated, including NAND-gates 288, 290, the MANSTF signal will be terminated (i.e. it will go low) whenever the following conditions occur:

1. CTRMAX signal goes high, indicating the memory capacity has been reached; and
2. INHL signal is high, indicating read-in into memory is to be terminated when memory capacity has been reached; and
3. TIN = PRG signal goes high, indicating identity between the input buffer (8) information and that specified by presettable control device 26.

In fact, the concurrence of TIN = PRG and CTRMAX means that the information which causes TIN = PRG is the last one to be stored in the memory. In other words, at the same time MANSTF is reset, the last information enters the memory.

NAND-gates 290, 292 will also cause the MANSTF signal to be terminated (i.e. it will go low) if the SC03 signal goes high and CTRMAX goes high, which means that so many Single Read or Skip operations have been made that maximum memory capacity has been reached.

Termination of the MANSTR signal will of course terminate the WRITE operation.

When the apparatus in the READ mode, the SRL (single-read) signal is controlled by the Single-Read button 300 via flip-flops 302, 304 and NAND-gate 306. The arrangement is such that the SRL signal will be 1 for one clock pulse for each depression of the Single-Read button 300, to enable one read-out cycle to occur.

When the Skip button 310 is depressed, the SRL signal on line 306 will be controlled by the circuit connected with the latter button, including flip-flops 312, 314, 316 NAND-gate 318 and line 320 applied to NAND-gate 306 producing the SRL signal. The Skip circuit is also controlled by the TIN = PRG and PERL signals such that the SRL signal will be 1 only when both the TIN = PRG and the PERL signals are 0, designating that the buffer 8 information matches the conditions specifed by the control device 26 and that no parity error has occurred. It will be seen that the latter circuit includes inverters 321, 322 and NAND-gate 324, the output of which is applied to flip-flop 316.

The schematic diagram of FIG. 13 also illustrates the control exerted by the auxiliary or remote control unit, e.g. 158 in FIG. 8. The remote unit is controlled by a switch 330 which has an "off" position disabling the remote unit, and an "on" position enabling it. When the remote unit is enabled, the RSTTF signal on line 332 is 1 to start the read-in whenever the remote start signal RSTTL is 1, this being controlled by AND-gate 334 and flip-flop 336. The start signal RSTTF becomes 0 and thereby ineffective to start a read-in, whenever the remote stop signal RSTPL is 1 or the manual start signal MANSTF is 0 or MANSTF is 1, this being controlled by inverters 338, 339 and NAND-gate 340.

All the flip-flops illustrated in FIG. 13 are preferably duel J–K master-slave flip-flops (e.g. one-half SN74107).

Figure 14:
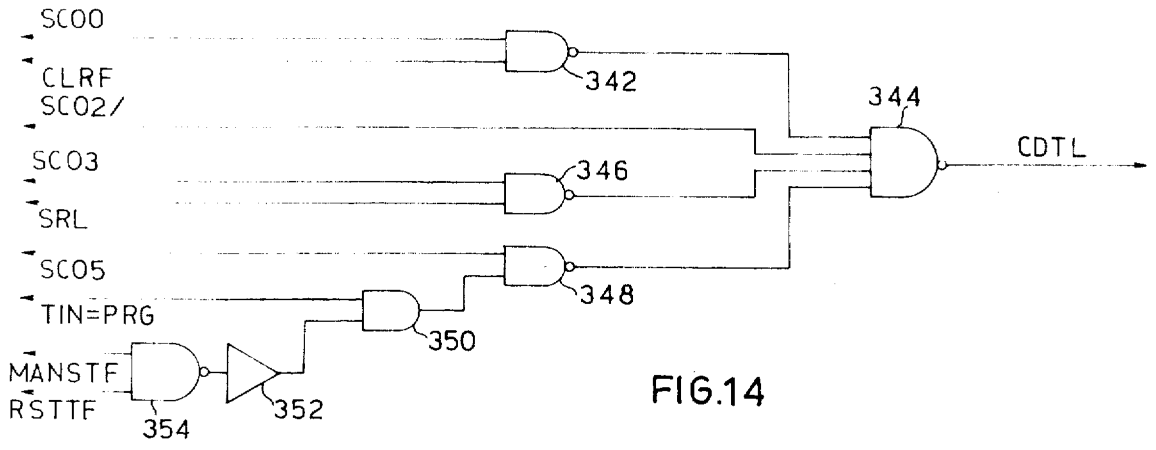
FIG. 14 is a schematic diagram illustrating the generation of the signal (CDTL) enabling read-in into the memory.

The arrangement illustrated in FIG. 14, including NAND-gate 344, assures that the CDTL signal generated is a logic AND of the following functions:

1. SC00*CLRF: (NAND-gate 342): That means that CDTL must be true during the sequence SC00 which corresponds to store all 0 in the memory.
2. SC = 02: That means that during the sequence SC02 information is shifted in the memory until CTRMAX alignment is finished.
3. SC = 03*SRL: (NAND-gate 346): Each time the operator pushes thé buttön SKIP or Single Read, CDTL must be true in order to get a new information on the display. SC03 means READ operation.
4. SC05*TIN = PRG*(MANSTF + RSTTE): NAND-gate 348, AND-gate 350, inverter 352 and NAND-gate 354: When the Test Equipment is ready, (MANSTF + RSTTF) and when the Equipment is in the WRITE Mode (SC ≠ 05) and when the data received is identical to what has been programmed, than CDTL comes up to store this date in memory.

Figure 15:
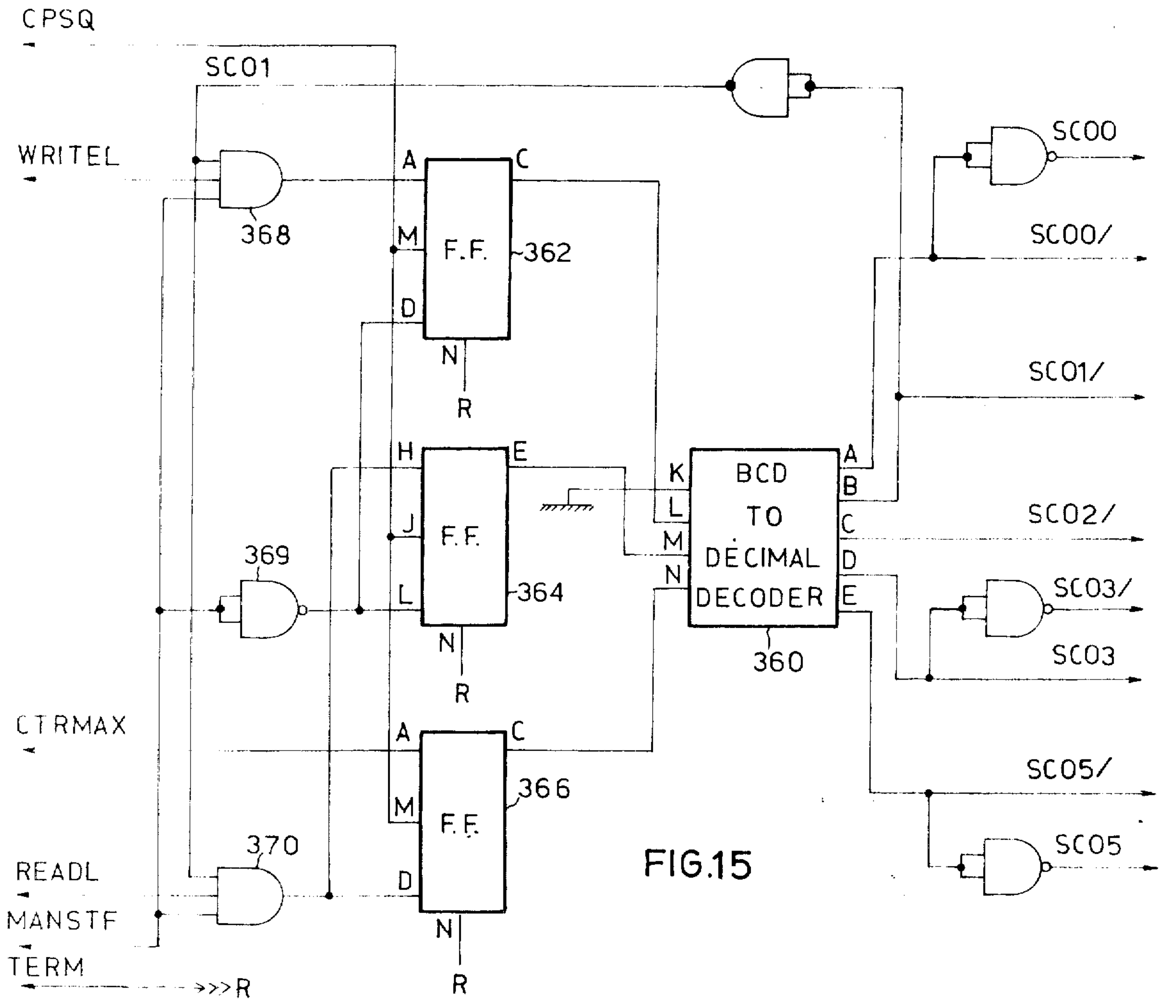
FIG. 15 diagrammatically illustrates a sequence counter that could be used.

A sequence counter which may be used for producing the sequence signals SC00–SC05 is illustrated in FIG. 15.

These sequence signals are produced from BCD to decimal decoder 360 (e.g. SN7442) having three inputs fed from three flip-flops 362,364 and 366 (e.g. SN74107).

One input terminal of flip-flop 362 is fed from AND-gate 368. The latter has one input receiving the WRITE (write-mode) signal, a second input receiving the MANSTP (manual start) signal, and a third input receiving the SC01 (Sequence 01) signal from decoder 360. Another input terminal of flip-flop 362 is fed only with the MANSTF signal through inverter 369.

In flip-flop 366, one input terminal is connected to the output of AND-gate 370, the inputs of which are the same as AND-gate 368 except that it receives the READL signal instead of the WRITEL signal. The other input terminal of flip-flop 366 receives the CTRMAX (maximum capacity of memory) signal.

In flip-flop 364, one terminal is connected to the output of AND-gate 370; and the other terminal is connected to receive the MANSTF/signal.

The arrangement is such that flip-flops 362 and 364 and 366 produce a 3-bits data output according to the combination of the inputs shown in the diagram of FIG. 15, while decoder 360 will produce, from this 3-bits data, the five sequence signals illustrated in the diagram.

Figure 16:
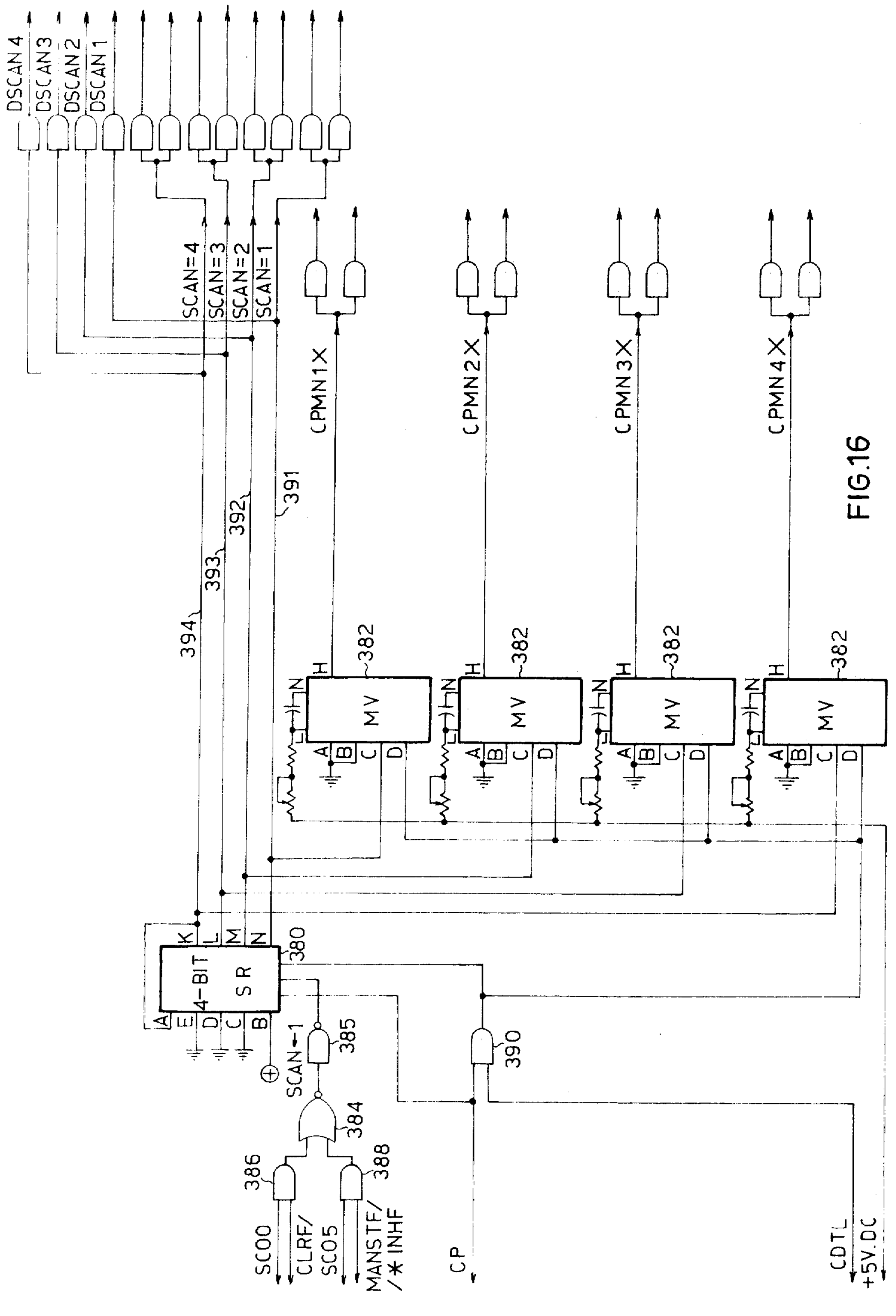
FIG. 16 diagrammatically illustrates a memory clock that could be used.

FIG. 16 is a schematic diagram illustrating one form of clock pulse generator that may be used for generating the SCAN signals and clock pulses CPMN for the memory.

The clock of FIG. 16 includes a 4-bit right-shift, left-shift register 380 (e.g. SN 7495) and four retriggerable monostable multivibrators 382. Shift register 380 is connected as shown with one terminal connected to NOR-gate 384 via inverter 385. Gate 384 has two inputs, one being AND-gate 386 fed by signals SC00 and CLRF/, and the other being AND-gate 388 fed by signals SC05 and MANSTF/ (or INHF if the apparatus is operating according to the remote control model). The clock terminals of shift register 380 is fed by the clock pulses CP, and another input terminal is connected to AND-gate 390 fed by the CDTL signal and clock pulses CP.

The four output terminals of shift register 380 are connected to the four output lines 391 – 394 for providing the four SCAN signals used in multiplexing the memory. The same four output signals are used to trigger multivibrators 382 to produce the memory clock pulses CPMN1-4.

Figure 17:
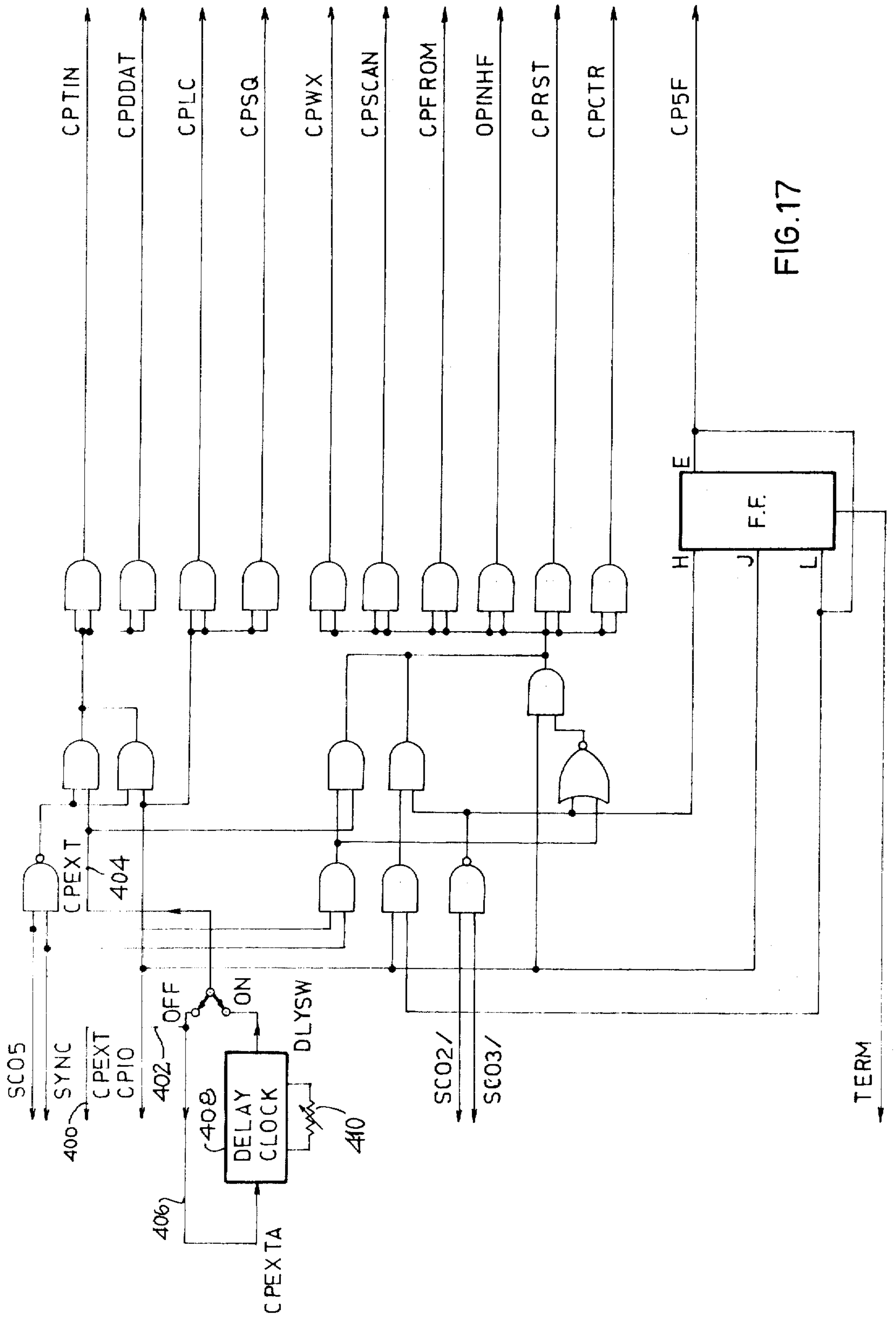
FIG. 17 illustrates an arrangement for producing the various clock pulses, and particularly the manner of introducing a variable delay.

FIG. 17 illustrates an arrangement for producing the various clock pulses.

A significant feature illustrated in FIG. 17 is the provision of a variable delay in the clock pulse. Thus, the external clock pulse CPEXT fed from line 400 is passed through line 402 to a switch DLYSW which, in its "off" position, directs the clock pulses directly to the clock supply line 404. When delay switch DLYSW, however, is in its "on" position, the clock pulses are passed via line 406 through a delay circuit 408 to clock supply line 404. Delay circuit 408 may be of conventional construction and variables, e.g. by potentiometer 410, to provide a delay in the range of 0 to 1/US. The clock width at the output of the delay circuit is fixed to an arbitrary value of 50 n.S.

The delay circuit is used to select a particular storage time in respect to the data to be stored, in order to compensate for skew on the data lines, and to search for any particular condition on the data lines, such as marginal delay or noise.

The manner of producing the other clock pulses will be apparent from the diagram of FIG. 17.

Operations

The apparatus illustrated is first operated in the WRITE mode, to selectively read-in test data received from the test leads, and then in the READ mode, to selectively read-out the test data for observation or analysis.

The operator selects the mode of operating the appartus by positioning mode selector switch 34 to either the WRITE position or the READ position.

When the apparatus is to be operated in the WRITE mode, the operator first defines what type of test data is to be read-into the memory unit, and then presets the various switches of the presettable control device 26 to specify the conditions under which read-in into the memory will take place.

Thus, if the operator wishes to record all the data appearing on the test leads, he presets switch 112 (FIGS. 3 and 6) to its "indifferent" position, wherein it will be seen (particularly from FIG. 6) that the TIN = PRG signal (the signal to effect read-in into the memory) will be produced continuously on line 157. Thus, during the operation of the apparatus all the information appearing on the input leads will be stored in the memory until the manual stop (MANSTF) signal (or the remote stop signals RSTPF, if the apparatus is operating in remote mode) is produced, or until the capacity of the memory is reached, in which case the CTRMAX signal is produced to terminate recording.

If only certain data is to be recorded, this may be specified with respect to all 16 input leads by presetting switches 100 (i.e. 100*a*–100*p*) to their respective "true," "false," or "indifferent" positions, according to the specific signal-combination to be monitored in each case.

Next, switch 102 is set to either its AT or its FROM position, to specify whether a read-in will be effected "at" each time there is identity between the setting of the presettable elements 100*a*–100*p* and the information in the respective registers, or "from" the time there is such identity. Next, the operator presets the DIFFERENT DATA switch 104 to specify whether ("on" position) or not ("off" position) a read-in is to be effected each time the data fed to the buffer registers 8 differs from that fed thereto in the immediately preceding cycle of operation.

Next, switch 112 is preset to its "true" position to indicate the above-specified conditions must be met to enable a read-in.

Finally, Clear button 270 (FIG. 13) is depressed to clear the apparatus, and then Start button 280 is depressed to initiate the read-in operation.

It will be seen that whenever the specified condition is met, by there being identity between the data in the buffer registers 8 and the conditions specified by means of the switches 100, 102, 104 and 112, a TIN = PRG signal (of logical 1) will be produced (FIG. 6) on line 157, which signal enables the read-in into the memory.

The arrangement illustrated including the presettable switches 100, 102, 104 and 112, permits an extremely large variety of conditions to be specified as to when recording will take place. For example, recording under the AT condition may be desired to obtain data as to the frequency of repetition of the information specified by the presettable control device 26, during a determined time. Recording under the FROM condition may be used when it is desired to continuously record the test data starting with a specific point as specified by the setting of the switches of the control device 26. Such a testing procedure is particularly useful in the early check-out phase of the system. Testing under the DIFFERENT DATA condition may be used, for example, to determine whether any phase change occurs in successive cycles of the apparatus.

While the apparatus is in the WRITE mode, read-ins will be effected into the memory according to the conditions prespecified by the presettable control device 26, until a manual stop (MANSTF) signal is produced, or until the maximum capacity of the memory has been reached, in which case a CTRMAX signal will be produced.

If the equipment, however, is operated in the REMOTE mode, using the remote or auxiliary control unit 158 (FIG. 8), the start and stop will be controlled by the remote unit, and in addition an inhibit (INH) signal may be provided by the remote unit for overriding the CTRMAX signal. In such a case, the memory will continuously record the information.

After the read-in of the test data has been completed, the operator may then, or at a more convenient time, effect a read-out of the data by moving selector switch 34, to the READ position.

In the READ mode, a "Single Read" operation is effected by depressing Single Read button 190. In this case only one read-out cycle from the memory will be generated, the information being read-out to the display device, as shown for example in FIG. 9. This operation may be used when the information is to be read-out of the memory and to be examined bit-by-bit. The operator effects a "Skip" operation by depressing Skip button 210, this operation effecting a read-out from the memory only of certain selected information. The presettable control unit 26, including the various resettable switches discussed above, is also used to specify the information selected for read-out. Thus, the operator can select to read-out only the information he feels relevant to the particular test performed. In most cases the operator will find it expeditious to specify certain information in the presettable control device and to read-out for analysis only the information which does not meet the conditions specified. For this purpose, he will set switches 100, 102 and 104 to specify the conditions, and will set switch 112 to its "false" position to specify that he wishes to read-out the information not meeting the specified conditions.

Figure 18:
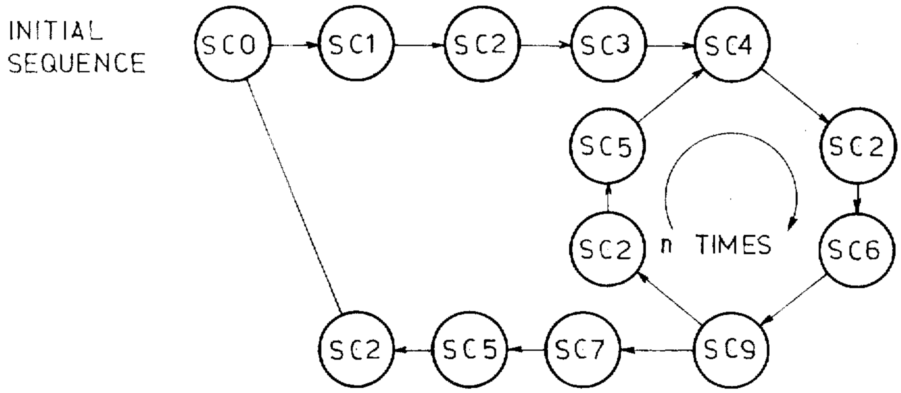
FIGS. 18 and 19 are diagrams illustrating how the use of the apparatus described may be further extended by the provision of an auxiliary or remote control unit.
Figure 19:
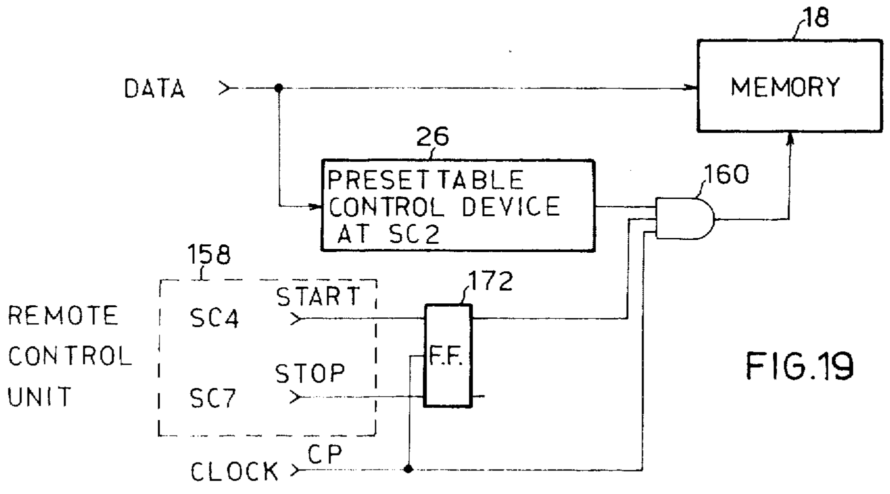

FIGS. 18 and 19 illustrate how the use of the apparatus may be further extended by the provision of the auxiliary or remote control unit, such as illustrated by unit 158 in FIG. 8.

For example, the operator is frequently interested in the general progress of the system under test, and is particularly interested in a certain phase of this progress. Consider the test of a system as shown in FIG. 18 involving a series of sequential operations, in which the operator may wish to record the occurences of sequences SC2 only in the loop SC4-SC2-SC6-SC9-SC2-SC5-SC4. It will be seen that what is required is to condition the apparatus in accordance with both the FROM and the AT conditions, the FROM condition to specify the above loop, and the AT condition to specify the SC2 sequence within that loop.

Conditioning the equipment for the combination of the FROM and AT conditions is made possible by the use of the auxiliary or remote control unit 158 of FIG. 8. Thus, the presettable control device 26, particularly switches 100 and 102 would be preset to specify the AT condition of SC2, and a similar control device in the remote control unit 158 would be used to specify the FROM condition by applying the start signal at the occurence of SC4, and the stop signal at the occurence of SC7. This is shown in the logical flow diagram of FIG. 19.

The remote control unit (158) may also be used to introduce delays corresponding to the type of delays that may be present during the normal use of the system under test.

Another use of the remote control unit (158) is to introduce an inhibit (INH) signal should it be desired to suppress the automatic termination of recording when the maximum capacity of the memory has been reached. As will be recalled with respect to the description of FIG. 8, an address counter 180 produces a signal which terminates read-in when the maximum capacity of the memory has been attained, but this signal may be overrided by the inhibit signal (on line 187 FIG. 8) from the remote control unit 158. This is particularly useful in locating frequently occurring sporadic errors. As long as the sporadic error is not encountered, the inhibit input suppresses the automatic termination of the read-in even after the maximum capacity of the memory has been reached. The remote control unit can be programmed to terminate the inhibit signal when the error occurs so that the read-in will stop only when the error occurs. In this way the apparatus will not only record the error, but will also record the sequence leading up to the error, which can be highly valuable in analyzing the cause of the error.

As also indicated in FIG. 8, the memory capacity can be increased by including a remote memory 18'. In addition, the remote memory 18' could be the memory of a data processing system.

While the invention has been described with respect to the preferred embodiments thereof illustrated in the drawings, it will be appreciated that some of the described arrangements can be used without others of the described arrangements, and that many other changes, modifications, and applications of the illustrated embodiments can be made.

I claim:

1. Data monitoring apparatus for monitoring a data processing system functioning under its normal program control, said apparatus comprising:

a plurality of input leads connectable to selected points of the data processing system to be monitored to receive information therefrom in the form of binary signals;

a memory unit for storing information received from said input leads;

an output device; and control means controlling the read-in of the information into the memory unit and the read-out of the information from the memory unit to the output device;

said control means comprising a presettable control device including a group of presettable control elements, one for each of said input leads, each of said control elements being presettable to a "true" state, a "false" state, or an "indifferent" state, for specifying different combinations of binary signals from the input leads for controlling the read-in of the information into the memory unit.

2. Apparatus as defined in claim 1, wherein said presettable elements of the control device also control the read-out of the information from the memory unit to the output device.

3. Apparatus as defined in claim 1, wherein said presettable control device additionally includes:

a further three-state control element presettable to a "true" state to further specify that said signal-combination specified by the group of control elements must be met to enable said read-in, a "false" state to further specify that said signal-combination must not be met to enable said read-in, and an "indifferent" state to enable said read-in irrespective of whether or not said signal-combination is met.

4. Apparatus as defined in claim 1, wherein said presettable elements are manually presettable three-position mechanical switches.

5. Apparatus as defined in claim 1, further including;

a plurality of buffer registers consisting of one for and fed by each of said input leads;

said group of presettable elements of the control device controlling the read-in of the information from said buffer registers into the memory unit.

6. Apparatus as defined in claim 5, wherein feeding of the information from the input leads to the buffer registers is controlled by clock pulses derived from the tested system via one of said input leads.

7. Apparatus as defined in claim 5 wherein feeding of the information from the input leads to the buffer registers is controlled by clock pulses derived from said testing apparatus.

8. Apparatus as defined in claim 5, wherein feeding of the information from the input leads to the buffer registers is controlled by a source of clock pulses having an adjustable delay.

9. Data test apparatus for testing a data processing system comprising:

a plurality of input leads connectable to selected test points of the data processing system for receiving data therefrom in the form of binary signals;

a memory unit;

and control means comprising a presettable control device presettable to specify selected conditions controlling the transmission of data inputted from the input leads to the memory unit, said presettable control device including a group of three-state presettable elements, one for each of said input leads, each of said control elements being presettable to a "true" state, a "false" state, or an "indifferent" state, for specifying different combinations of binary signals inputted from the input leads controlling the read-in into the memory unit.

10. Apparatus as defined in claim 9 wherein said presettable control device further includes:

a further control element presettable to one of three states, namely, a "true" state to further specify that the signal-combination specified by said group of presettable elements must be met to enable said read-in, a "false" state to further specify that said signal-combination must not be met to enable said read-in, and an "indifferent" state to enable said read-in irrespective of whether or not said signal-combination is met.

11. Apparatus as defined in claim 9, wherein said presettable control device further includes;

"AT" condition-determining means for effecting a read-in "at" each time there is identity between the settings of the group of presettable elements and the data from the respective input leads; and means selectively enabling or disabling said "AT" condition-determining means.

12. Apparatus as defined in claim 9, wherein said presettable control device further includes:

"FROM" condition-determining means for effecting a read-in starting "from" the time there is identity between the settings of the group of presettable elements and the data from the respective input leads, said read-in continuing until terminated; and means selectively enabling or disabling said "FROM" condition-determining means.

13. Apparatus as defined in claim 9 wherein said presettable control device further includes:

"DIFFERENT DATA" condition-determining means for effecting a read-in each time the data from said input leads differs from that in the immediately preceding cycle of operation; and means selectively enabling or disabling said "DIFFERENT DATA" condition-determining means.

14. Apparatus as defined in claim 13, wherein said "DIFFERENT DATA" condition-determining means comprises:

a plurality of buffer registers including one for and fed by each of said input leads;

a source of read-in clock pulses;

auxiliary registers receiving, during each read-in clock pulse, the data received in the buffer registers during the preceding clock pulse;

a comparator comparing, during each read-in clock pulse, the data in said auxiliary registers with that in said buffer registers;

and means for effecting, when a non-identity occurs between said compared data, a read-in of the data in said buffer registers into said memory unit.

15. Apparatus as defined in claim 9, wherein said control means includes:

"AT" condition-determining means for effecting a read-in "at" each time there is identity between the settings of the presettable elements and the data from the respective input leads;

"FROM" condition-determining means for effecting a continuous read-in starting "from" the time there is identity between the settings of the presettable elements and the data from the respective input leads;

"DIFFERENT DATA" condition-determining means for effecting a read-in each time that the data from said input leads differs from that previously thereon; and selector means for selecting the condition-determining means to be effective to control the read-in of the data from the input leads into the memory unit.

16. Data test apparatus for testing a data processing system functioning under its own program control, said data test apparatus comprising:

a plurality of input leads connectable to selected test points of the data processing system for receiving data therefrom in the form of binary signals;

a memory unit;

an output device;

and control means controlling the read-in of data inputted from the input leads into the memory unit and the read-out of data from the memory unit to the output device;

said control means comprising a presettable control device presettable to specify selected conditions and including a group of presettable control elements, one for each of said input leads, each of said control elements being presettable to a "true" state, a "false" state, and an "indifferent" state, for specifying different signal-combinations, and means effective according to the signal-combination specified by said presettable control device enabling the read-in of data inputted from the input leads into the memory unit or the read-out of data from the memory unit to the output device.

17. Apparatus as defined in claim 16, wherein said control means includes:

a mode selector switch for selectively operating the apparatus according to a WRITE mode wherein data is read into the memory unit, or according to a READ mode wherein data is read out of the memory unit to the output device.

18. Apparatus as defined in claim 17, wherein said presettable control device further includes;

"AT" condition-determining means for effecting a read-in "at" each time the condition specified by said presettable control device is met by the signal-combination inputted from the input leads;

"FROM" condition-determining means for effecting a continuous read-in starting "from" the time said condition is met by the signal-combination inputted from the input leads until terminated;

and a condition selector switch for selecting the said condition-determining means to be effective to control the read-in or read-out of the data into or out of the memory unit.

19. Apparatus as defined in claim 18, wherein said presettable control device further includes:

"DIFFERENT DATA" condition-determining means selectively actuatable by said condition selector switch for effecting a read-in or read-out with respect to the memory unit depending on whether the signal-combination at any one time differs from the immediately-preceding signal-combination.

20. Apparatus as defined in claim 17, wherein said presettable control device further includes:

an additional presettable element settable to one of three states, namely: a "true" state to effect the read-in or read-out when the signal-combination specified by the group of presettable elements is met; a "false" state to effect the read-in or read-out when said specified signal-combination is not met, and an "indifferent" state to effect the read-in or read-out irrespective of whether or not said specified signal-combination is met.

21. Apparatus as defined in claim 17, wherein said control means further includes:

a SINGLE READ switch effective when actuated while the apparatus is in the READ mode, to effect a single read-out cycle of data from the memory unit to the output device.

22. Apparatus as defined in claim 17, wherein said control means further includes:

a SKIP switch effective, when actuated while the apparatus is in the READ mode, to control the read-out of data in the memory unit to the output device in accordance with the condition specified by said presettable control device.

23. Apparatus according to claim 17, wherein said control means further includes:

inhibit means for inhibiting read-in into the memory unit while the apparatus is in the READ mode, and inhibiting read-out from the memory unit while the apparatus is in the WRITE mode.

24. Apparatus according to claim 17, further including buffer register means fed by said input leads and consisting of a single buffer register for each input lead.

25. Apparatus as defined in claim 17, wherein said memory unit comprises a plurality of multiplexed shift registers.

26. Apparatus as defined in claim 25, wherein said plurality of shift registers form a closed loop, the output feeding beck into the input thereof.

27. Apparatus as defined in claim 17, wherein said output device is a visual display.

28. Apparatus as defined in claim 17, wherein said presettable control elements each comprises a three-position mechanical switch.

29. Apparatus as defined in claim 17, wherein said control means further includes:

a counter;

means for incrementing the counter for each read-in of data into the memory unit;

and means for terminating the read-in when said counter is incremented the number of counts corresponding to the maximum capacity of the memory unit.

30. Apparatus as defined in claim 29, wherein said control means further includes:

an auxiliary control unit for inhibiting termination of the read-in by said counter.

31. Data monitoring apparatus comprising:

a memory unit; including a plurality of output lines;

an output device;

and control means controlling the read-out of the information from the memory unit to the output device;

said control means comprising a presettable control device including a group of presettable mechanical switches one for each memory output line, each switch being presettable to one of three positions, namely a "true" position, a "false" position, and an "indifferent" position, and means controlled by the settings of said mechanical switches for determining the conditions under which read-out is effected from the memory unit to the output device.

32. Apparatus as defined in claim 31; wherein said presettable mechanical switches include:

a further switch presettable to a "true" position to further specify that said condition specified by the group of switches must be met to enable said read-out, a "false" position to specify that said condition must not be met to enable said read-out, and an "indifferent" position to enable said read-out irrespective of whether or not said condition is met.

33. Apparatus as defined in claim 31, wherein said control means further includes:

a SINGLE READ switch operable, when actuated, to effect a single read-out cycle of information from the memory unit to the output device;

and a SKIP switch operable, when actuated, to control the read-out of information from the memory unit in accordance with the settings of said presettable control device.

34. Data monitoring apparatus for monitoring a data processing system, comprising:

a plurality of lines each connectable to different monitor points of a data processing system for receiving binary data signals therefrom;

a monitoring device for receiving selected binary data signal-combinations from said plurality of lines;

and a presettable control device interposed between said lines and said monitoring device and presettable to specify selected conditions controlling the transmission of data from said lines to the monitoring device;

said presettable control device including a group of three-state control elements one for each of said plurality of lines;

each of said control elements being presettable to a "true" state, a "false" state, and an "indifferent" state to specify specific combinations of binary signals on said lines to control the data transmitted to said monitoring device.

35. Apparatus as defined in claim 34, wherein said presettable control device additionally includes:

a further three-state control element presettable to a "true" state, a "false" state and an "indifferent" state to specify the further condition that data transmission to the monitoring device is to be effected when there is, respectively, identity, non-identity, or irrespective of identity, between the settings of the group of control elements and the signals on said lines.

36. Apparatus as defined in claim 34, wherein said presettable control device additionally includes:

a further control element presettable to specify a further "AT" condition or a further "FROM" condition, for selectively effecting the transmission of the data signals to the monitoring device either "at" each time of "from" each time, respectively, the conditions specified by the presettable control device are met by the data signals on said plurality of lines.

37. Apparatus as defined in claim 34, wherein said presettable control device additionally includes:

a further control element presettable to specify further a "DIFFERENT DATA" condition for effecting the transmission of the data signals to the monitoring device conditioned on whether or not the data inputted from said plurality of lines during one time period differs from that inputted from said lines in the preceding time period.

38. Apparatus as defined in claim 34, wherein said monitoring device is a memory unit in which are read in the signal-combinations meeting the conditions specified by said presettable control device.

39. Apparatus as defined in claim 34, wherein said plurality of lines are connected to a memory unit, and said monitoring device is a read-out unit selectively reading out the information in said memory unit meeting the conditions specified by said presettable control device.

40. Apparatus as defined in claim 39, further including a read-out device and a mode selector switch for selectively operating the apparatus according to a WRITE mode wherein information is read out into the memory unit from the plurality of lines, or according to a READ mode wherein the information is read out of the memory unit to the read-out device.

* * * * *